United States Patent
Kachi

(10) Patent No.: US 7,708,368 B2
(45) Date of Patent: May 4, 2010

(54) METHOD FOR EVALUATING COLOR MIXING, IMAGE RECORDING METHOD, AND IMAGE RECORDING APPARATUS

(75) Inventor: Yasuhiko Kachi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1098 days.

(21) Appl. No.: 11/093,298

(22) Filed: Mar. 30, 2005

(65) Prior Publication Data

US 2005/0219298 A1    Oct. 6, 2005

(30) Foreign Application Priority Data

Mar. 31, 2004    (JP)    ............................. 2004-107855

(51) Int. Cl.
*B41J 2/01*    (2006.01)
(52) U.S. Cl. .............................. 347/19; 347/43; 347/15
(58) Field of Classification Search .................. 347/14, 347/15, 40–41, 102, 43, 105, 19; 358/19; 106/31, 43; 346/46

See application file for complete search history.

(56) References Cited

U.S. PATENT DOCUMENTS

| | | | |
|---|---|---|---|
| 4,675,696 A * | 6/1987 | Suzuki | 346/46 |
| 5,140,339 A * | 8/1992 | Higuma et al. | 347/43 |
| 5,395,434 A * | 3/1995 | Tochihara et al. | 106/31.43 |
| 6,371,609 B1 | 4/2002 | Oikawa | |
| 6,474,768 B1 * | 11/2002 | Yano et al. | 347/19 |
| 2001/0009463 A1 * | 7/2001 | Kuno et al. | 358/1.9 |

FOREIGN PATENT DOCUMENTS

| | | |
|---|---|---|
| JP | 3-247450 A | 11/1991 |
| JP | 4-173250 A | 6/1992 |
| JP | 11-198357 A | 7/1999 |
| JP | 2000-71481 A | 3/2000 |
| JP | 2001-270139 A | 10/2001 |

* cited by examiner

*Primary Examiner*—Lam S Nguyen
(74) *Attorney, Agent, or Firm*—Birch, Stewart, Kolasch & Birch, LLP

(57) ABSTRACT

The method for evaluating color mixing between dots of two different colors discharged onto a recording medium, the method comprises the steps of: outputting a color mixing evaluation print having a color mixing evaluation patch formed on a recording medium by dots of two different colors in such a manner that at least a portion of the dots are adjacent or overlapping; measuring a density of the color mixing evaluation patch of the outputted color mixing evaluation print; and evaluating color mixing of the dots of two colors, according to density profiles for the dots of two colors forming the color mixing evaluation patch, as obtained by the density measuring step.

10 Claims, 16 Drawing Sheets

| MEASUREMENT ITEM | EVALUATION METHOD | RELATIONSHIP TO IMAGE QUALITY |
|---|---|---|
| $\sigma d$ | SMALLEST VALUE OF $\sigma d$ | GOOD RESOLUTION WITH RESPECT TO COLOR MIXING |
| $av(d)$ | SMALLEST VALUE OF $av(d)$ | GOOD REPRODUCIBILITY OF MIDRANGE COLORS, AND GOOD RESOLUTION WITH RESPECT TO COLOR MIXING |

FIG.11

| MEASUREMENT ITEM | TARGET VALUE | CORRECTION FACTOR | WEIGHTING FACTOR |
|---|---|---|---|
| $\sigma d$ | 0 | $a_1 \fallingdotseq 10$ | $b_1$ |
| $av(d)$ | LENGTH OF OVERLAP = D | $a_2 \fallingdotseq 3$ | $b_2$ |

FIG.12

| IMAGE QUALITY MODE | $b_1$ | $b_2$ |
|---|---|---|
| TEXT + IMAGES | 1 | 1 |
| IMAGES | 2 | 1 |

# METHOD FOR EVALUATING COLOR MIXING, IMAGE RECORDING METHOD, AND IMAGE RECORDING APPARATUS

BACKGROUND OF THE INVENTION

1. Field of the Invention

The present invention relates to a method for evaluating color mixing and an image recording apparatus and method, and more particularly, to technology for preventing color mixing of inks on the surface of a recording medium when recording an image by discharging ink from a plurality of nozzles toward the recording medium.

2. Description of the Related Art

Conventionally, as an example of an image recording apparatus, an inkjet recording apparatus that has an inkjet head (ink discharge head) arranged with an array of multiple nozzles is known. The inkjet recording apparatus forms an image on a recording medium by discharging ink from the nozzles while the inkjet head and the recording medium are moved relatively.

Conventionally, various methods of discharging the ink for such an inkjet recording apparatus are known. For example, the inkjet recording apparatus is known as a method of a piezoelectric system in which an oscillating plate constituting part of a pressure chamber (ink chamber) is deformed by the deformation of a piezoelectric element (piezoelectric ceramics) to vary the capacity of the pressure chamber, ink is introduced into the pressure chamber through an ink supply channel during the capacity increase of the pressure chamber, and the ink in the pressure chamber is discharged as droplets from a nozzle when the capacity of the pressure chamber decreases. Moreover, the inkjet recording apparatus is also known as a method of a thermal inkjet system in which the ink is heated to create air bubbles and is discharged by the energy of expansion when the air bubbles increase in size.

In an image recording apparatus having an ink discharge head such as an inkjet recording apparatus, ink is supplied to the ink discharge head from an ink tank storing ink, via ink supply channels, and ink is discharged by one of the various methods described above. However, in cases where a color image is recorded by using a plurality of inks of different colors, then if an ink of one color is recorded in an overlapping fashion onto ink of a different color recorded previously, before that ink has fixed and hardened, then color mixing occurs and image quality declines.

Therefore, conventionally, various methods have been proposed in order to prevent color mixing and thus improve image quality, when inks of different colors are recorded in an overlapping fashion.

In one known example, ink dots of respective colors ejected from respective color recording heads are recorded during one rotation of a rotating body supporting the recording medium, in a thinned-out fashion whereby the dots are separated by at least one dot space in the sub-scanning direction, which coincides with the direction of rotation of the recording medium (see, for example, Japanese Patent Application Publication No. 2000-71481). Therefore, mixing and spreading of adjacent ink dots is prevented, while achieving high-quality image recording.

In a further example, an inkjet recording apparatus comprises a device for estimating the state of drying of the recorded ink, and the recording intervals between one recording action and the next recording action are altered by changing the conveyance velocity of the recording medium and changing the interval between the recording heads, in accordance with the estimation results. In this way, it is possible to prevent recording irregularities in the regions where different inks are superimposed, while maintaining the through-put of the recording apparatus, and therefore, image quality is improved (see, for example, Japanese Patent Application Publication No. 03-247450).

Yet a further example describes a color inkjet recording method in which, in the same printing region, printing by at least one head of a plurality of heads is carried out after leaving a time period sufficiently longer than the printing delay time of the adjacent head, from the time of printing by another head. In this way, color prints which do not contain color bleeding can be obtained (see, for example, Japanese Patent Application Publication No. 04-173250).

However, in Japanese Patent Application Publication No. 2000-71481, for example, the dots are recorded in a thinned-out fashion during one rotation of the rotating body holding the recording medium, and therefore it is necessary to carry out a plurality of rotations in order to record one full image. Therefore, productivity is low.

Furthermore, Japanese Patent Application Publication No. 03-247450 comprises a device for estimating the state of drying and a device for adjusting the dot recording interval, in such a manner that the interval at which subsequent dots are recorded is adjusted in accordance with the state of drying. However, no device for fixing or curing the ink that has been deposited on the recording medium is provided, and the ink is simply left to dry naturally. Therefore, it is not possible always to prevent color mixing in a reliable fashion.

Moreover, Japanese Patent Application Publication No. 04-173250 simply sets a time period greater than the printing delay between adjacent dots, but it does not comprise a device for adjusting fixing or curing, and therefore has the same problems as Japanese Patent Application Publication No. 03-247450.

SUMMARY OF THE INVENTION

The present invention has been devised in view of the foregoing circumstances, and an object thereof is to provide a method for evaluating color mixing, and an image recording method and apparatus, whereby color mixing of inks discharged from an ink discharge device and deposited onto the surface of a recording medium can be evaluated, and image recording which avoids color mixing can be achieved.

In order to attain the aforementioned object, the present invention is directed to a method for evaluating color mixing between dots of two different colors discharged onto a recording medium, the method comprising the steps of: outputting a color mixing evaluation print having a color mixing evaluation patch formed on a recording medium by dots of two different colors in such a manner that at least a portion of the dots are adjacent or overlapping; measuring a density of the color mixing evaluation patch of the outputted color mixing evaluation print; and evaluating color mixing of the dots of two colors, according to density profiles for the dots of two colors forming the color mixing evaluation patch, as obtained by the density measuring step.

Thereby, it is possible to evaluate color mixing of inks discharged onto a recording medium, readily and automatically.

In order to attain the aforementioned object, the present invention is also directed to a method for evaluating color mixing between dots of two different colors discharged onto a recording medium, the method comprising the steps of: outputting a color mixing evaluation print including a plurality of color mixing evaluation patches in which dots of two different colors are recorded in parallel fashion in such a manner that at least a portion of the dots of two different colors are adjacent or overlapping, while varying at least one of parameters of a difference between discharge times of the dots of two different colors, a fixing energy for fixing the dots onto the recording medium and a curing energy for the dots, between a plurality of levels; measuring a density of each of the color mixing evaluation patches of the outputted color mixing evaluation print; and evaluating color mixing of the dots of two colors, according to density profiles of the dots of two colors forming the color mixing evaluation patches, as obtained by the density measuring step, for each combination of the parameters.

The difference between the discharge times of dots of two different colors can be varied by changing the conveyance velocity of the recording medium or by changing the separation distance between the heads provided for each respective color.

Preferably, the color mixing between the dots of two colors is evaluated according to at least one of an average value and a standard deviation of a distance between points which are prescribed threshold values for each color in a plurality of density profiles relating to the dots of two colors forming the color mixing evaluation patch, as obtained by measuring the density of the color mixing evaluation patch at a plurality of locations.

Thereby, it is possible to evaluate color mixing automatically by means of a numeral calculation from the density measurement data.

In order to attain the aforementioned object, the present invention is also directed to a method for evaluating color mixing between dots of two different colors discharged onto a recording medium, the method comprising the steps of: outputting a color mixing evaluation print including a plurality of color mixing evaluation patches in which dots of two different colors are recorded in parallel fashion in such a manner that at least a portion of the dots of two different colors are adjacent or overlapping, while varying at least one of parameters of a difference between discharge times of the dots of two different colors, a fixing energy for fixing the dots onto the recording medium and a curing energy for the dots, between a plurality of levels; calculating one of an average value and a standard deviation of a distance between the points which are prescribed threshold values for each color in a plurality of density profiles relating to the dots of two colors forming the color mixing evaluation patch, as obtained by measuring the density of each color mixing evaluation patch of the color mixing evaluation print at a plurality of locations; and evaluating color mixing by calculating an evaluation value used to evaluate the color mixing by weighting factors for calculating the evaluation value, in accordance with the average value of the distance, the standard deviation of the distance, the difference between discharge times, and a recording mode which indicates whether a matter to be recorded is text, image, or both text and image.

Thereby, it is possible to maintain high image quality by changing the weightings used when evaluating color mixing, in accordance with the recording mode which corresponds to the type of recording data.

In order to attain the aforementioned object, the present invention is also directed to an image recording method for recording an image by discharging dots onto a recording medium, the method comprising the step of performing image recording by setting control parameters for controlling at least one of the difference between the discharge times of the dots of two different colors, the fixing energy for fixing the dots onto the recording medium, and the curing energy for the dots, according to a color mixing evaluation result obtained by means of the above-described method for evaluating color mixing.

Preferably, the image recording method further comprises the step of setting the control parameters in accordance with a type of dot, a type of recording medium, and the recording mode which indicates whether a matter to be recorded is text, image, or both text and image.

Thereby, it is possible to achieve high quality image recording which prevents color mixing, by using the result of color mixing evaluation.

In order to attain the aforementioned object, the present invention is also directed to an apparatus for evaluating color mixing which evaluates color mixing of dots discharged onto a recording medium, the apparatus comprising: a color mixing evaluation print output device which outputs a color mixing evaluation print having a color mixing evaluation patch formed on a recording medium by dots of two different colors in such a manner that at least a portion of the dots are adjacent or overlapping; a density measurement device which measures a density of the color mixing evaluation patch of the color mixing evaluation print; and a color mixing evaluation device which evaluates color mixing of the dots of the two colors, according to density profiles for the dots of the two colors forming the color mixing evaluation patch, as obtained by the density measurement device.

In order to attain the aforementioned object, the present invention is also directed to an apparatus for evaluating color mixing between dots of two different colors discharged onto a recording medium, the apparatus comprising: a color mixing evaluation print output device which outputs a color mixing evaluation print including a plurality of color mixing evaluation patches in which dots of two different colors are recorded in parallel fashion in such a manner that at least a portion of the dots of two different colors are adjacent or overlapping, while varying at least one of parameters of a difference between discharge times of the dots of two different colors, a fixing energy for fixing the dots onto the recording medium and a curing energy for the dots, between a plurality of levels; a density measurement device which measures a density of each of the color mixing evaluation patches of the outputted color mixing evaluation print; and a color mixing evaluation device which evaluates color mixing of the dots of two colors, according to density profiles of the dots of two colors forming the color mixing evaluation patches, as obtained by the density measurement device, for each combination of the parameters.

Preferably, the color mixing evaluation device which evaluates the color mixing between the dots of two colors includes a device which calculates an average value and a standard deviation of a distance between points which are prescribed threshold values for each color in a plurality of density profiles relating to the dots of two colors forming the color mixing evaluation patch, as obtained by measuring the density of the color mixing evaluation patch at a plurality of locations; and the color mixing evaluation device evaluates the color mixing according to the average value and the standard deviation of the distance thus calculated.

In order to attain the aforementioned object, the present invention is also directed to an image recording apparatus which records an image by discharging dots onto a recording medium, the apparatus comprising: the above-described color mixing evaluation apparatus; a discharge time difference control device which controls the difference between the discharge times of the dots of two different colors when recording image data onto the recording medium; a fixing device which fixes the dots onto the recording medium; a fixing control device which controls the fixing energy of the fixing device; a curing device which cures the dots; a curing control device which controls the curing energy of the curing device; and a parameter setting device which sets the control parameters for controlling the discharge time difference control device, the fixing control device and the curing control device, according to the color mixing evaluation result obtained by the color mixing evaluation apparatus, wherein the image recording is performed by controlling at least one of the discharge time difference control device, the fixing control device and the curing control device, by means of the set control parameters.

Thereby, it is possible to set optimal control parameters for preventing color mixing, automatically.

In order to attain the aforementioned object, the present invention is also directed to an image recording apparatus which records an image by discharging dots onto a recording medium, the apparatus comprising: a color mixing evaluation print output device which outputs a color mixing evaluation print including a plurality of color mixing evaluation patches in which dots of two different colors are recorded in parallel fashion in such a manner that at least a portion of the dots of two different colors are adjacent or overlapping, while varying at least one of parameters of a difference between discharge times of the dots of two different colors, a fixing energy for fixing the dots onto the recording medium and a curing energy for the dots, between a plurality of levels; a discharge time difference control device which controls the difference between the discharge times of the dots of two different colors when recording image data onto the recording medium; a fixing device which fixes the dots onto the recording medium; a fixing control device which controls the fixing energy of the fixing device; a curing device which cures the dots; a curing control device which controls the curing energy of the curing device; a color mixing evaluation result input device for inputting an evaluation result for the color mixing between the dots of two colors according to the color mixing evaluation patches in the color mixing evaluation print; and a parameter setting device which sets the control parameters for controlling the discharge time difference control device, the fixing control device and the curing control device, according to the color mixing evaluation result inputted to the color mixing evaluation result input device, wherein the image recording is performed by controlling at least one of the discharge time difference control device, the fixing control device and the curing control device, by means of the set control parameters.

Thereby, control parameters are set by inputting a color mixing evaluation result based on visual evaluation, for example.

Preferably, the image recording apparatus further comprises: an ink type determination device which determines a type of ink; a recording medium type determination device which determines a type of the recording medium; a recording mode determination device which determines a recording mode indicating whether a matter to be recorded is text, image or both text and image, from the recording image data; and a device for setting and storing the control parameters in accordance with the ink type, the recording medium type and the recording mode.

By means of these apparatuses, the method for evaluating color mixing and the image recording method described above can be implemented and high-quality images in which color mixing is prevented can be obtained.

As described above, according to the method for evaluating color mixing and the image recording method and apparatus relating to the present invention, it is possible to evaluate color mixing of inks discharged toward a recording medium and deposited on the surface of the recording medium, and therefore high-quality images which prevent color mixing can be recorded.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 11 is an illustrative diagram showing respective parameters for implementing control in order to prevent color mixing;

FIG. 12 is an illustrative diagram showing the relationship between image quality modes and weighting factors;

DETAILED DESCRIPTION OF THE PREFERRED EMBODIMENTS

Figure 1:
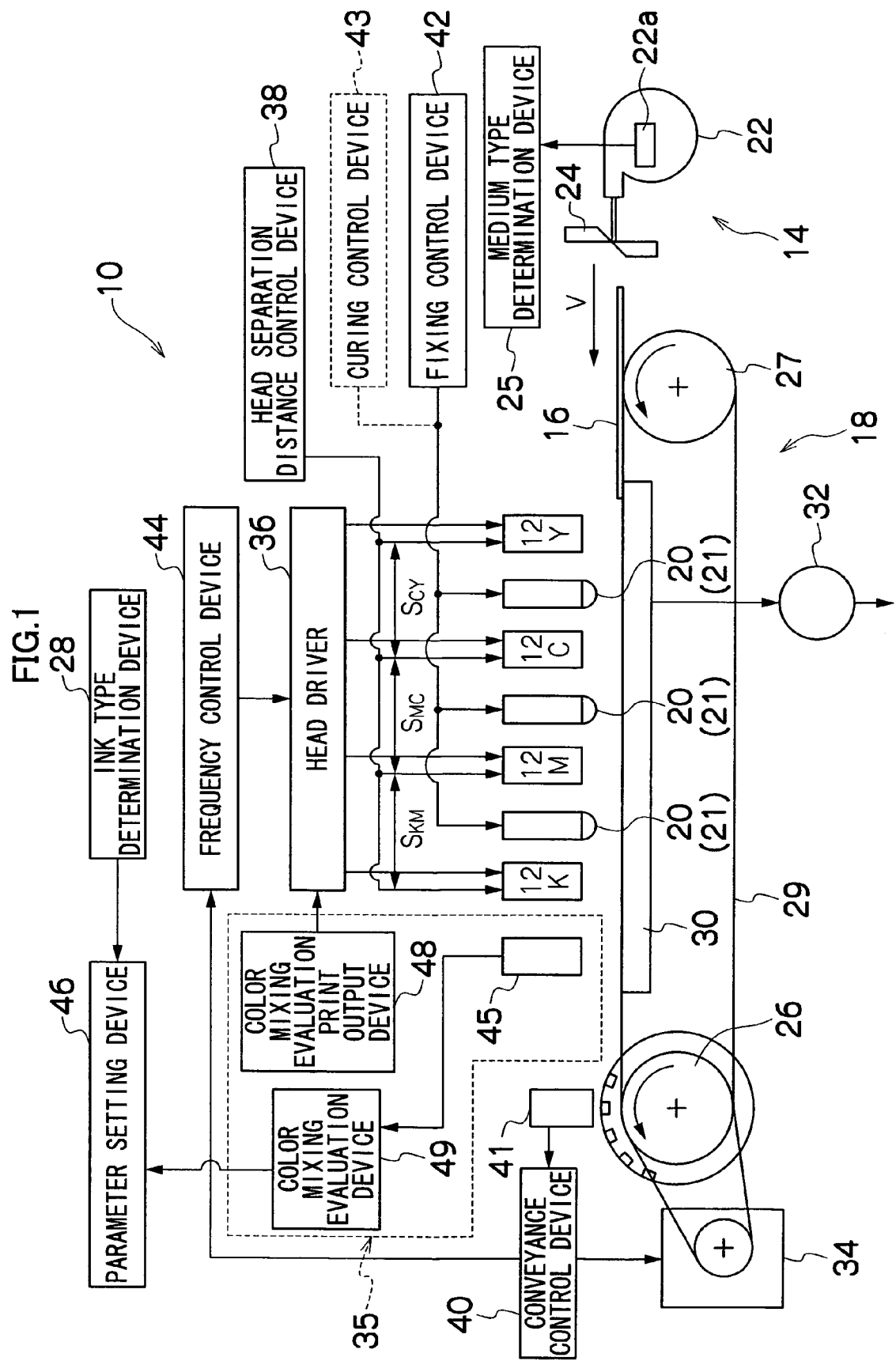
FIG. 1 is a general schematic drawing of an inkjet recording apparatus according to a first embodiment of the present invention, showing at a block diagram in part.

FIG. 1 is a general schematic drawing of an inkjet recording apparatus according to first embodiment of the present invention, showing at a block diagram in part.

As shown in FIG. 1, the inkjet recording apparatus 10 comprises: a plurality of print heads 12Y, 12C, 12M, and 12K for ink colors of yellow (Y), cyan (C), magenta (M), and black (K), respectively; a conveyance unit 18 for supplying a recording paper 16 as a recording medium from a paper supply unit 14 to the print heads 12Y, 12C, 12M, and 12K; a decurling unit 18 for removing curl in the recording paper 16; and a fixing/curing device 20 (fixing device) for fixing and curing the ink deposited on the recording paper 16.

In FIG. 1, a magazine 22 for rolled paper (continuous paper) is shown as an example of the paper supply unit 14; however, a plurality of magazines with paper differences such as paper width and quality may be jointly provided. Moreover, paper may be supplied with a cassette that contains cut paper loaded in layers and that is used jointly or in lieu of a magazine 22 for rolled paper.

In the case of the configuration in which roll paper is used, a cutter 24 is provided as shown in FIG. 1, and the continuous paper is cut into a desired size by the cutter 24. When cut paper is used, the cutter 24 is not required.

In the embodiment of the present invention, an information recording medium such as a bar code and a wireless tag containing information about the type of paper is attached to a medium determination notch 22a in the magazine 22, and a medium determination device 25 for reading the information contained in the information recording medium is comprised in the inkjet recording apparatus 10. As described later, the information read by the medium determination device 25 is used to configure an optimum control parameter for recording the image to the type of paper so as to record the image. By the way, recording the image in present invention is included about recording by not only an image date, but also a text date and the like.

The recording paper 16 delivered from the magazine 22 retains curl due to having been loaded in the magazine 22. In order to remove the curl, heat is applied to the recording paper 16 in the decurling unit (not shown) by a heating drum in the direction opposite from the curl direction in the magazine 22. The heating temperature at this time is preferably controlled so that the recording paper 16 has a curl in which the surface on which the print is to be made is slightly round outward.

The conveyance unit 18 has a configuration in which an endless belt 29 is set around rollers 26 and 27 so that the portion of the endless belt 33 facing at least the nozzle face of the print heads 12Y, 12C, 12M, and 12K forms a horizontal plane (flat plane).

The belt 29 has a width that is greater than the width of the recording paper 16, and a plurality of suction apertures (not shown) are formed on the belt surface. A suction chamber 30 is disposed in a position facing the nozzle surface of the print heads 12Y, 12C, 12M, and 12K on the interior side of the belt 29, which is set around the rollers 26 and 27, as shown in FIG. 1; and the suction chamber 30 provides suction with a fan 32 to generate a negative pressure, and the recording paper 16 is held on the belt 29 by suction.

The belt 29 is driven in the counterclockwise direction in FIG. 1 by the motive force of a motor 34 being transmitted to at least one of the rollers 26 and 27 (for example, the roller 26 of left hand as shown in FIG. 1), which the belt 29 is set around, and the recording paper 16 held on the belt 29 is conveyed from right to left in FIG. 1 at the relative conveyance velocity V.

Figure 2:
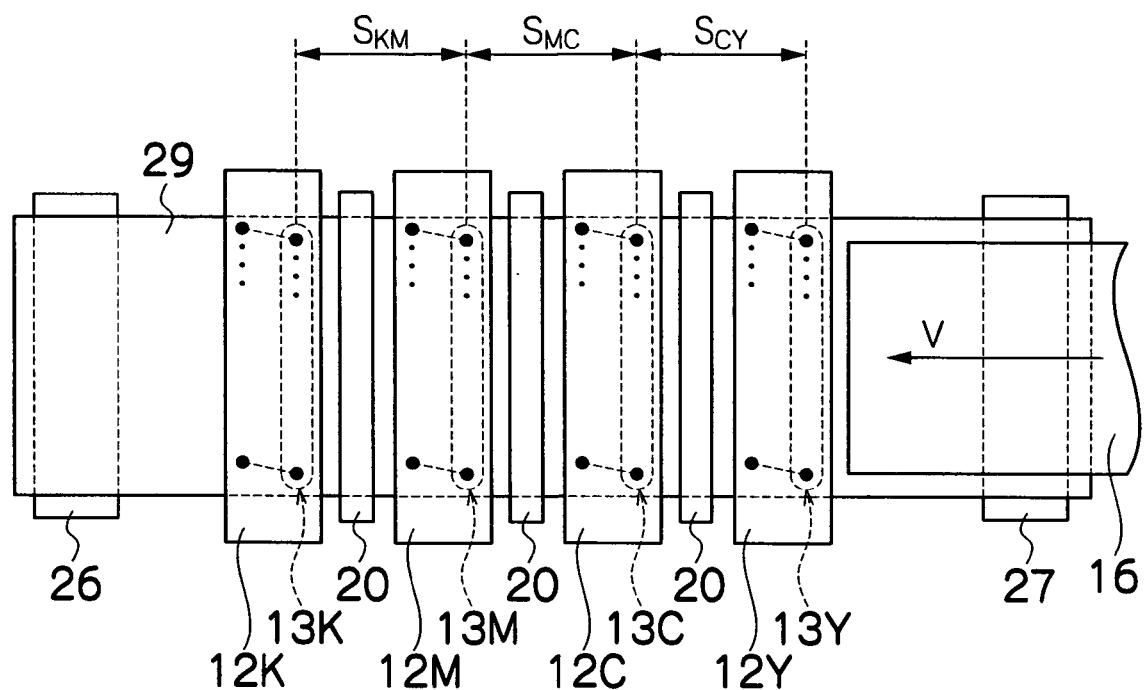
FIG. 2 is a plan view showing an enlarged view of the region of a print head in the inkjet recording apparatus shown in FIG. 1.

FIG. 2 is an enlarged plane view around the print heads 12Y, 12C, 12M, and 12K. As shown in FIG. 2, the print heads 12Y, 12C, 12M, and 12K are corresponding to the YCMK ink colors, and form a full-line head in which a line head having a length that corresponds to the maximum paper width is disposed in the main scanning direction perpendicular to the delivering direction of the recording paper 16 (represented by the arrow in FIG. 2), which is substantially perpendicular to a width direction of the recording paper 16. A fixing/curing device 20 are disposed between each of the print heads 12Y, 12C, 12M, and 12K corresponding to the maximum paper width.

In addition, the described full-line head includes a structure in which in which a plurality of short print heads are arranged between the entire width of the paper.

Each of the print heads 12Y, 12C, 12M, and 12K comprises a plurality of nozzle rows 13Y, 13C, 13M and 13K in which nozzles are arranged in the form of a two-dimensional matrix. Furthermore, the distance between the respective upstream side nozzle rows in each of the print heads 12Y, 12C, 12M, and 12K, with respect to the direction of conveyance of the recording paper 16, is called the nozzle separation distance S for each of the print heads 12Y, 12C, 12M, and 12K. More specifically, as shown in FIG. 2, the distance between the nozzle row 13Y on the upstream side of the print head 12Y in the conveyance direction, and the nozzle row 13C on the upstream side of the print head 12C in the conveyance direction, is called the nozzle row separation distance $S_{CY}$, between these two colors, Y and C. Similarly, the distance between the nozzle row 13C of the print head 12C and the nozzle row 13M of the print head 12M, is defined as the nozzle row separation distance $S_{MC}$, and the distance between the nozzle row 13M of the print head 12M and the nozzle row 13K of the print head 12K is defined as the nozzle row separation distance $S_{KM}$. These nozzle row separation distances $S_{CY}$, $S_{MC}$, $S_{KM}$ are variable and can be controlled freely.

As shown in FIG. 1 or FIG. 2, the print heads 12Y, 12C, 12M, and 12K corresponding to the respective ink colors are arranged in the order, Y (yellow), C (cyan), M (magenta), K (black), from the upstream side in the conveyance direction of the recording paper 16 (from right to left in the diagram). A color image can be formed on the recording paper 16 by discharging inks of respective colors from the print heads 12K, 12C, 12M, and 12Y, onto the recording paper 16 while conveying the recording paper 16 by means of the conveyance unit 18.

Since an image is recorded while conveying the recording paper 16 in this way, the difference between the discharge timings of dots of two different colors, which corresponds to the recording speed when recording the image data (print data) onto the recording paper 16, is governed approximately by the conveyance velocity of the recording paper 16. Therefore, if the conveyance velocity of the recording paper 16 is increased and ink is discharged from the print heads 12Y, 12C, 12M, and 12K in accordance with this increased conveyance velocity, then the difference between discharge times can be shortened (the recording speed can be increased).

In the present embodiment, this difference between dot discharge times can be changed by controlling the conveyance velocity of the recording medium or by changing the distance between the heads forming dots of two different colors.

By means of the print heads 12Y, 12C, 12M, and 12K which constitute full line heads covering the full width of the paper provided for each ink color, it is possible to record an image onto the whole surface of the recording paper 16, at high speed, by means of one operation of moving the recording paper 16 and the print heads 12Y, 12C, 12M, and 12K relatively to each other (in other words, by means of one scan).

Furthermore, an ink type determination device 28 (see FIG. 1) for determining the ink type is provided in the vicinity of an ink tank (not illustrated) which supplies inks of various colors to the respective print heads 12Y, 12C, 12M, and 12K. The ink type determination device 28 is not limited in particular, and in the case of a cartridge type ink tank, for example, it may be composed so as to read in an ID indicating the ink type from an information recording body, or the like, attached to the cartridge.

Although the configuration with the four standard colors, YCMK, is described in the present embodiment, the combinations of the ink colors and the number of colors are not limited to these, and light and/or dark inks can be added as required. For example, a configuration is possible in which print heads for discharging light-colored inks such as light cyan and light magenta are added.

Returning again to FIG. 1, ink discharge from the print heads 12Y, 12C, 12M, and 12K is controlled by means of the head driver 36. The fixing and curing devices 20 provided between the print heads 12Y, 12C, 12M, and 12K serve to fix the ink discharged onto the recording paper 16 from the print heads 12Y, 12C, 12M, and 12K, and suitable devices are used in accordance with the ink discharged.

Here, "fixing" indicates a combination of permeation of the ink deposited on the recording paper 16 into the fibers of the paper, and drying of the ink from the surface, and it means that the ink deposited onto the surface of the recording paper 16 no longer exists in the form of a liquid droplet. For example, in the case of a water-based ink, the fixing and curing device 20 may be a device which applies heat energy, such as a heater, or an infrared irradiation device, or a fan (hot air fan) which blows an air flow (hot air flow) onto the paper. These devices for fixing the ink may be used independently or a plurality of these devices may be used conjointly.

Fixing and curing devices 20 are disposed respectively between the four print heads 12Y, 12C, 12M, and 12K, as illustrated in FIG. 1 or FIG. 2, and these fixing and curing devices 20 fix the ink discharged from the print heads, in such a manner that even when ink is subsequently discharged onto, or in the vicinity of, the fixed ink from the next print head, the respective ink colors do not mix.

In the present embodiment, by controlling at least one of three factors, namely, the respective nozzle row separation distances of the print heads 12Y, 12C, 12M, and 12K of each color (namely, the distance $S_{CY}$ between the nozzle rows 13Y and 13C of the print heads 12Y and 12C, the distance $S_{MC}$ between the nozzle rows 13C and 13M of the print heads 12C and 12M, and the distance $S_{KM}$ between the nozzle rows 13M and 13K of the print heads 12M and 12K), and/or the relative conveyance velocity of the recording paper 16 (the difference between discharge times), and/or the fixing time through controlling the fixing energy applied to the ink by the fixing and curing devices 20, it is possible to prevent color mixing of the inks while recording images at high speed.

In the present embodiment, if the nozzle row separation distances are actually variable, then since the nozzle row separation distances are varied by changing the distances between the print heads, this is equivalent to saying that the nozzle row separation distances are controlled by controlling the distances between the print heads.

Furthermore, in the present embodiment, if color mixing is avoided by controlling the nozzle row separation distances (distances between print heads), the relative conveyance velocity (the difference between discharge times), and the fixing time (the fixing energy), then by setting the various control parameters to optimal values in such a manner that recording can be performed as the highest possible speed, it is possible to prevent color mixing while also achieving high-speed recording.

Therefore, in addition to the foregoing, the inkjet recording apparatus 10 according to the present embodiment comprises, as devices for controlling and avoiding color mixing: a color mixing evaluation unit (color mixing evaluation device) 35 which evaluates color mixing (color mixing evaluation device) 35; a head separation distance control device 38 which controls the nozzle row separation distance (print head separation distance); a relative conveyance velocity control device 40 (hereafter, simply called "conveyance control device" 40) which controls the difference between discharge times by controlling the relative conveyance velocity V of the recording paper 16; a fixing control device 42 which controls the fixing time of the ink by controlling the fixing energy of the fixing and curing devices 20; a frequency control device 44 for aligning the dot pitch of the recorded image in cases where the relative conveyance velocity is varied; and a parameter setting device 46 for setting control parameters in such a manner that the respective control devices implement optimal control. Furthermore, an encoder 41 for determining the relative conveyance velocity V is provided on the roller 26, in order that the relative conveyance velocity V can be controlled by the conveyance control device 40.

As described in detail below, the color mixing evaluation unit 35 comprises a color mixing evaluation print output device 48 for outputting a color mixing evaluation print on which color mixing evaluation patterns (color mixing evaluation patches) for evaluating color mixing are formed, a densitometer 45 for measuring the density of the color mixing evaluation patches of the outputted color mixing evaluation print, and a color mixing evaluation device 49 for evaluating color mixing according to the measurement results from the densitometer 45. The method of evaluating color mixing is described in detail below.

The head separation distance control device 38 controls the ink discharge timing from the (nozzle rows of the) respective print heads 12Y, 12C, 12M, and 12K onto the recording paper 16, by changing the distance between adjacent print heads (namely, the nozzle separation distances, $S_{CY}$, $S_{MC}$, $S_{KM}$, and so on, between a nozzle row formed in one print head and a nozzle row formed in the adjacent print head) through moving the print heads 12Y, 12C, 12M, and 12K of the respective colors in the paper conveyance direction.

For example, if it is sought to increase the color mixing prevention effect, then the nozzle row separation distances are increased in such a manner that the ink discharged from one nozzle row has dried (become fixed) to a greater extent by the time that ink is discharged from a nozzle row of the next print head. The specific device for changing the nozzle row separation distances is not limited in particular; for example, the respective print heads 12Y, 12C, 12M, and 12K may be made to move along rails provided at either end of the full line head, by means of a ball screw mechanism, or the like.

The conveyance control device 40 controls the rotational speed of the motor 34 according to a determination signal from the rotary encoder 41. In this case, if an optimal value is set for the relative conveyance velocity parameter, V, as described below, then the rotation of the motor 34 is controlled in such a manner that the relative conveyance velocity of the recording paper 16 assumes the set velocity.

If the fixing and curing devices 20 apply heat, for example, then the fixing control device 42 controls the fixing time t1 by controlling the heat energy applied by changing the temperature setting of the fixing and curing devices 20, or by also changing the rotational speed of the fan blowing a hot air flow, and thus controlling the fixing energy applied to the ink on the recording paper 16.

The frequency control device 44 controls the ink discharge timing from the respective print heads 12Y, 12C, 12M, and 12K in accordance with any change in the relative conveyance velocity V of the recording paper 16, in such a manner that the recorded image is formed to the prescribed dot pitch. Therefore, uniform image quality is maintained.

The parameter setting device 46 sets optimal parameters for controlling at least one of the head separation distance control device 38, the conveyance control device (discharge time difference control device) 40, and the fixing control device 42, according to the color mixing evaluation result obtained as a result of measuring the density of the color mixing evaluation print.

In the inkjet recording apparatus 10 relating to the present embodiment described above, color mixing is prevented by fixing the ink discharged onto the recording paper 16 by controlling the fixing and curing devices 20 by means of the fixing control device 42. However, it is also possible to use an ultraviolet (UV) curable ink which is hardened by a polymerization reaction when UV light is irradiated onto the ink, or an ink that is curable by irradiation of electromagnetic radiation, in which case curing devices 21 such as irradiation devices for irradiating the appropriate electromagnetic radiation onto the ink are provided instead of the fixing and curing devices 20, color mixing of the inks being prevented by controlling the curing devices 21 by means of the curing control device 43 in such a manner that the ink is cured.

Here, "curing" means that the ink is solidified by a chemical reaction due to the irradiation of light or other electromagnetic radiation, or the application of heat, in such a manner that the ink hardens and becomes fixed to the surface of the recording paper 16. If UV-curable ink is used, then the curing device 21 may be a UV irradiation device, a halogen lamp, or a laser light emitting diode, for instance. Furthermore, if a solid ink is used, then a cooling device such as a Peltier element or water-cooling device, may be used.

Below, where the fixing control device 42 and the fixing and curing devices 20 are described, it is also possible to use a curing control device 43 and curing devices 21 instead of these, as illustrated in FIG. 1, in which case, the control procedure is exactly the same. More specifically, the curing control device 43 may control the curing time t2 by, for example, controlling the curing energy applied to the ink on the recording paper 16 by changing the intensity of light irradiated by the curing devices 21, or the range of light irradiation. By curing the ink droplets on the surface of the recording medium, the ink droplets on the surface of the medium disappear and color mixing can therefore be prevented.

Figure 3:
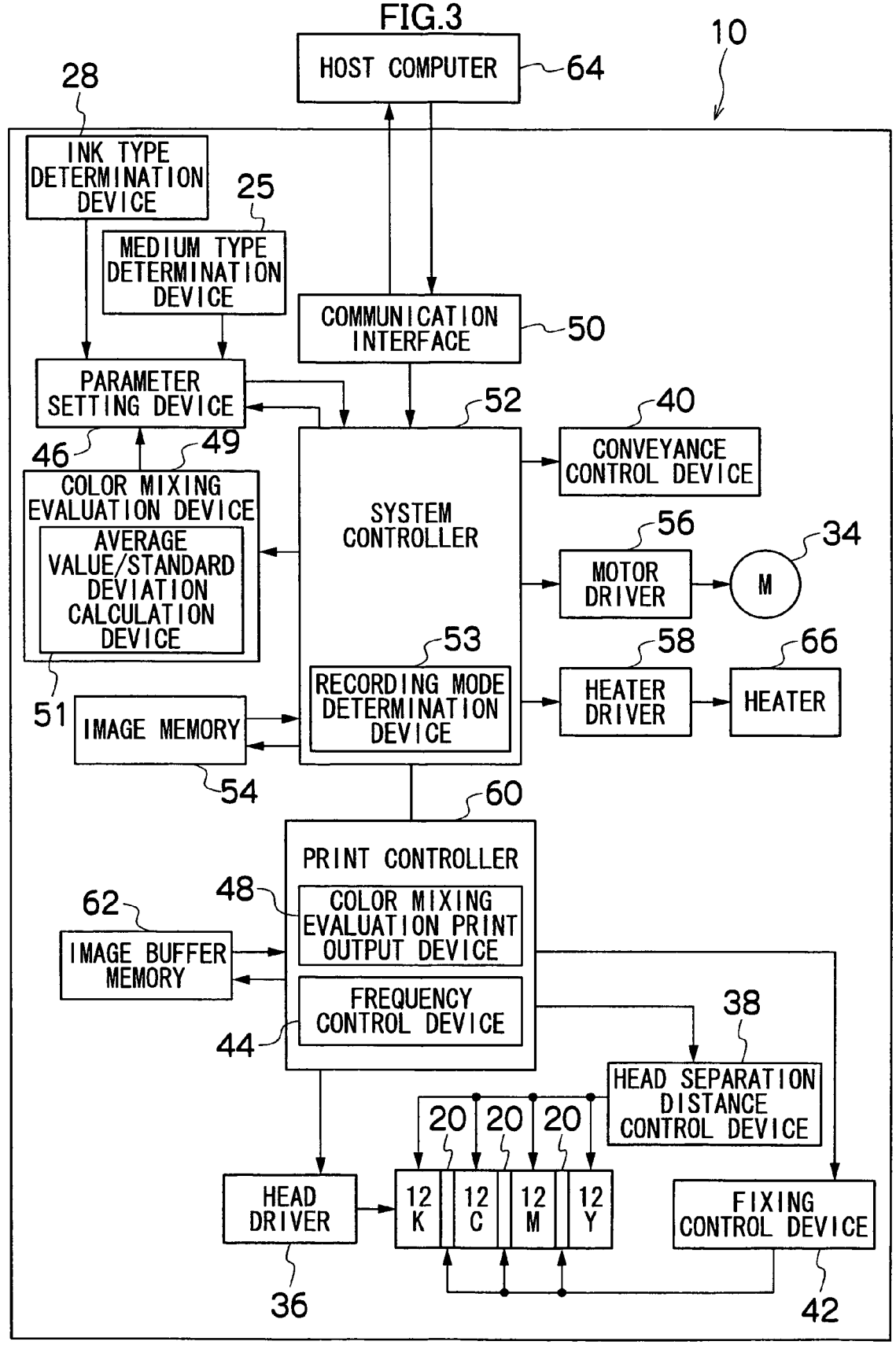
FIG. 3 is a block diagram showing the system composition of an inkjet recording apparatus according to a first embodiment of the present invention.

FIG. 3 is a block diagram of the principal components showing the system configuration of the inkjet recording apparatus 10. The inkjet recording apparatus 10 has a communication interface 50, a system controller 52, an image memory 54, a motor driver 56, a heater driver 58, a print controller 60, an image buffer memory 62, a head driver 36, and other components.

The communication interface 50 is an interface unit for receiving image data sent from a host computer 64. A serial interface such as USB, IEEE1394, Ethernet, wireless network, or a parallel interface such as a Centronics interface may be used as the communication interface 50. A buffer memory (not shown) may be mounted in this portion in order to increase the communication speed. The image data sent from the host computer 64 is received by the inkjet recording apparatus 10 through the communication interface 50, and is temporarily stored in the image memory 54. The image memory 54 is a storage device for temporarily storing images inputted through the communication interface 50. The image memory 54 is not limited to memory composed of a semiconductor element, and a hard disk drive or another magnetic medium may be used.

The system controller 52 controls the communication interface 50, image memory 54, motor driver 56, heater driver 58, and other components. The system controller 52 has a central processing unit (CPU), peripheral circuits therefore, and the like. The system controller 52 controls communication between itself and the host computer 64, controls reading and writing from and to the image memory 54, and performs other functions, and also generates control signals for controlling a heater 66 and the motor 34 in the conveyance system.

The motor driver (drive circuit) 56 drives the motor 34 in accordance with commands from the system controller 52. The heater driver (drive circuit) 58 drives the heater 66 of the post-drying unit (not shown) or the like in accordance with commands from the system controller 52.

The print control unit 60 is a control unit having a signal processing function for performing various treatment processes, corrections, and the like, in accordance with the control implemented by the system controller 52, in order to generate a signal for controlling printing, from the image data in the image memory 54, and it supplies the print control signal (image data) thus generated to the head driver 36. Prescribed signal processing is carried out in the print control unit 60, and the discharge amount and the discharge timing of the ink droplets from the respective print heads 12Y, 12C, 12M, and 12K is controlled via the head driver 36, according to the image data. By this means, prescribed dot size and dot positions can be achieved.

The print control unit 60 is provided with the image buffer memory 62; and image data, parameters, and other data are temporarily stored in the image buffer memory 62 when image data is processed in the print control unit 60. The aspect shown in FIG. 3 is one in which the image buffer memory 62 accompanies the print control unit 60; however, the image memory 54 may also serve as the image buffer memory 62. Also possible is an aspect in which the print control unit 60 and the system controller 52 are integrated to form a single processor.

The head driver 36 drives actuators for the print heads 12Y, 12C, 12M and 12K of the respective colors according to the print data received from the print control unit 60. A feedback control system for keeping the drive conditions for the print heads constant may be included in the head driver 36.

Furthermore, the inkjet recording apparatus 10 according to the present embodiment also comprises, in addition to the foregoing, a head separation distance control device 38 for controlling the head separation distances, $S_{CY}$, $S_{MC}$, $S_{KM}$, between the adjacent print heads (in the present embodiment, this corresponds to the print heads 12Y and 12C, the print heads 12C and 12M, and the print heads 12M and 12K, as shown in FIG. 1 and FIG. 2); a conveyance control device 40 for controlling the relative conveyance velocity V of the recording paper 16; a fixing control device 42 for controlling the fixing time t1 of the ink discharged onto the recording paper 16 by controlling the fixing energy of the fixing and curing devices 20; a frequency control device 44 for controlling the ink discharge frequency in accordance with any change in the relative conveyance velocity V; a parameter setting device 46 for setting parameters for controlling the respective control devices; a color mixing evaluation print output device 48 for forming a color mixing evaluation pattern in order to output a print for evaluating color mixing as described in detail below, and outputting a print for evaluating color mixing from the print heads 12Y, 12C, 12M, and 12K, by means of the head driver 36; a color mixing evaluation device 49 for performing color mixing evaluation according to density measurement results from a color mixing evaluation print; and the like.

Here, the frequency control device 44 and the color mixing evaluation print output device 48 are provided inside the print control unit 60 and are controlled by the system controller 52. Furthermore, as described in detail below, an average value/standard deviation calculation device 51 is provided in the color mixing evaluation device 49 in order to calculate prescribed numerical values used for evaluating color mixing according to density profiles obtained from density measurement. Moreover, a recording mode determination device 53 is provided in the system controller 52 in order to determine the recording mode from the image data (recording data). Here, the recording mode indicates whether the recording data includes text data, includes image data, or includes a combination of text and image data.

Next, a method for evaluating color mixing and setting optimal parameters for the control devices in order to prevent color mixing and achieve high-speed recording will be described. Firstly, the process of creating a color mixing evaluation pattern in order to evaluate color mixing is described.

This color mixing evaluation pattern is formed by recording two colors of ink at different levels of the values of the relative conveyance velocity V (which corresponds to the difference between discharge times or the recording speed) and the fixing energy E, in order to determine the degree of intermixing between the two colors of ink (yellow (Y) and cyan (C), cyan (C) and magenta (M), magenta (M) and black (K)) discharged from two print heads 12Y and 12C, 12C and 12M, and 12M and 12K, which are positioned adjacently in the inkjet recording apparatus 10, as shown in FIG. 1 or FIG. 2.

Figure 4:
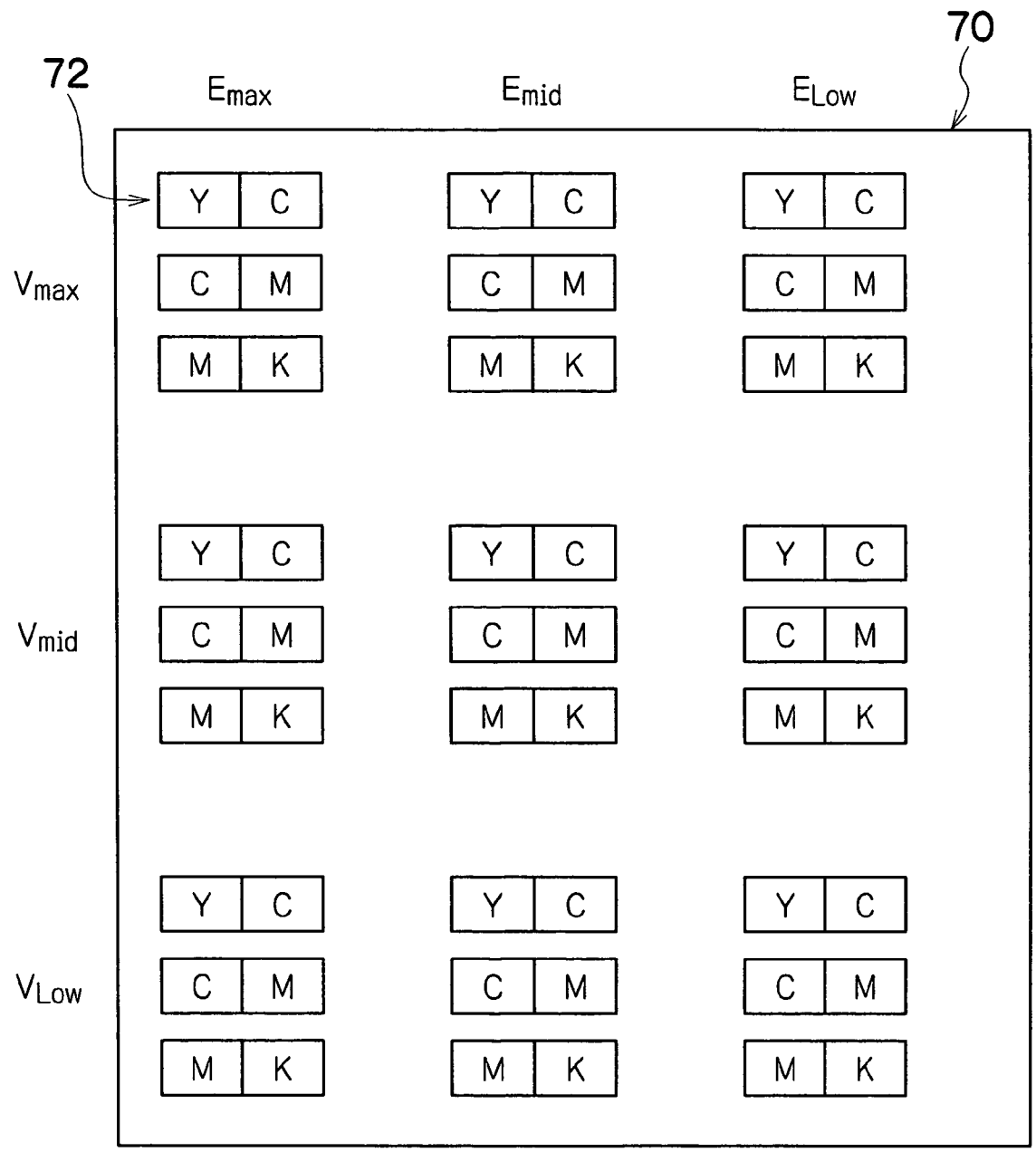
FIG. 4 is an illustrative diagram showing an example of a color mixing evaluation pattern used in the first embodiment.

FIG. 4 shows an example of a color mixing evaluation pattern. As shown in FIG. 4, the color mixing evaluation pattern 70 is formed by recording at three different level settings, max, mid and low, for the relative conveyance velocity V and the fixing energy E. Therefore, for each combination of two adjacent ink colors, a patch 72 (color mixing evaluation patch) including 9 color mixing evaluation patterns is formed. Here, of the three levels for the conveyance velocity V and the fixing (curing) energy E, max indicates maximum velocity (or maximum energy), mid indicates a value at approximately ⅔ of the maximum, and low indicates a value at approximately ⅓ of the maximum.

In the present embodiment, the difference between the discharge times of dots of two different colors is changed by varying the conveyance velocity V (at a uniform head separation distance), but it is also possible to form patches by varying the head separation distance (at a uniform conveyance velocity V) in order to change the difference between discharge times.

Figure 5A:
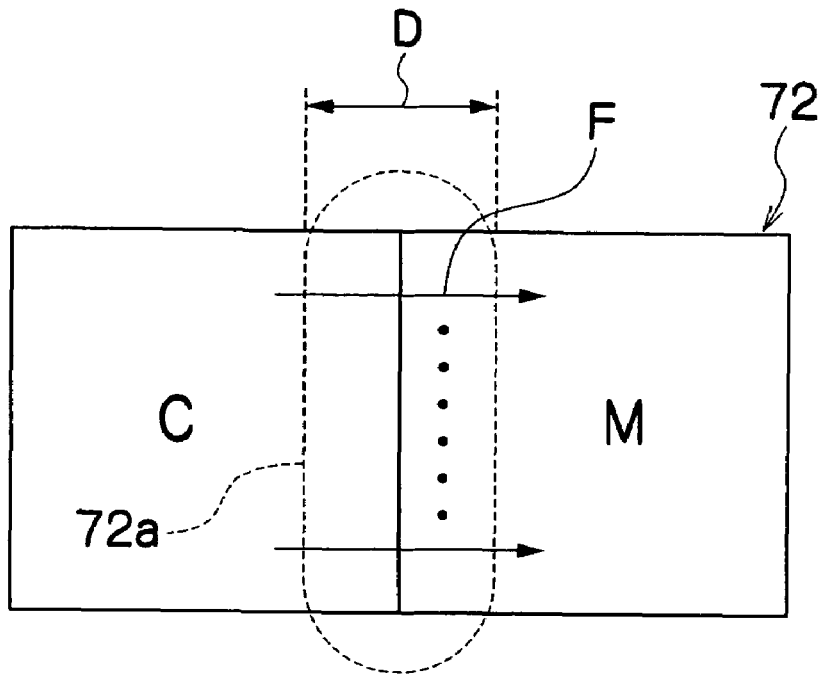
FIG. 5A is an illustrative diagram showing respective patches of a color mixing evaluation pattern.

The patches 72 of the color mixing evaluation pattern 70 comprise two colors (for example, C and M) arranged in a left/right fashion as shown in FIG. 5A, and the color patches are printed (recorded) in a square shape. In particular, at the boundary region 72a between the two colors, several hundred dots are printed in an overlapping fashion in order to evaluate color mixing, as illustrated by the enlarged view in FIG. 5B.

Figure 6A:
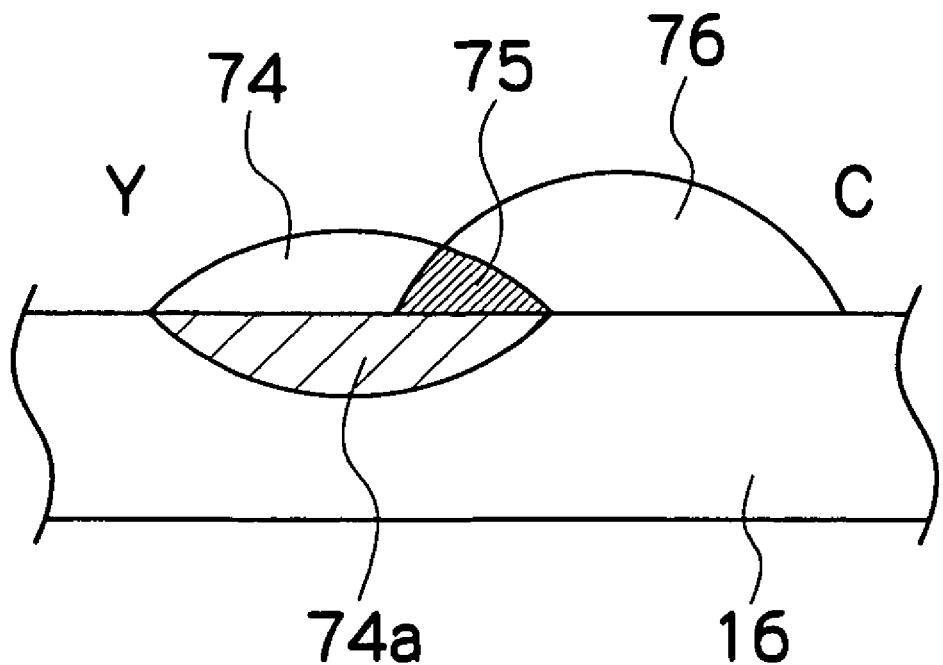
FIGS. 6A and 6B are cross-sectional diagrams showing the aspect of color mixing between two inks on the recording medium.
Figure 6B:
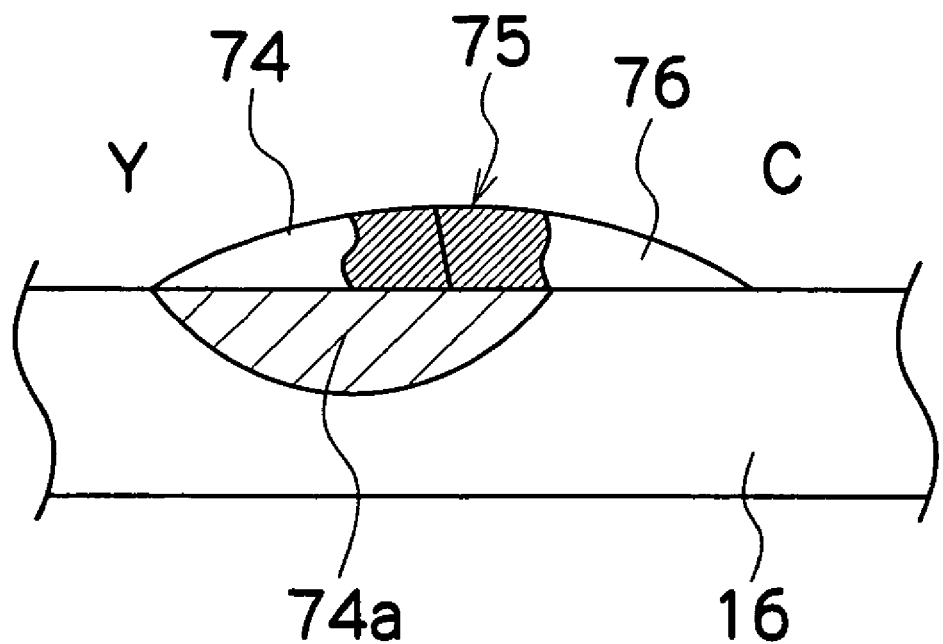

Furthermore, FIGS. 6A and 6B shows a situation where inks of two colors mix together. As shown in FIG. 6A, Y ink 74 is discharged onto the recording paper 16, and C ink 76 is discharged at a slight displacement from the Y ink, so that it is partially overlapping. The Y ink 74 gradually permeates into the recording paper 16, as indicated by the reference numeral 74a, and it proceeds to dry on the surface of the recording paper 16.

In this case, if C ink 76 is discharged before the Y ink 74 has become fixed, then color mixing (bleeding) will occur in the overlapping portion 75. Thereupon, as shown in FIG. 6B, the inks will become fixed in a state where the two colors are combined (or have bled together) in the overlapping portion 75.

Figure 5B:
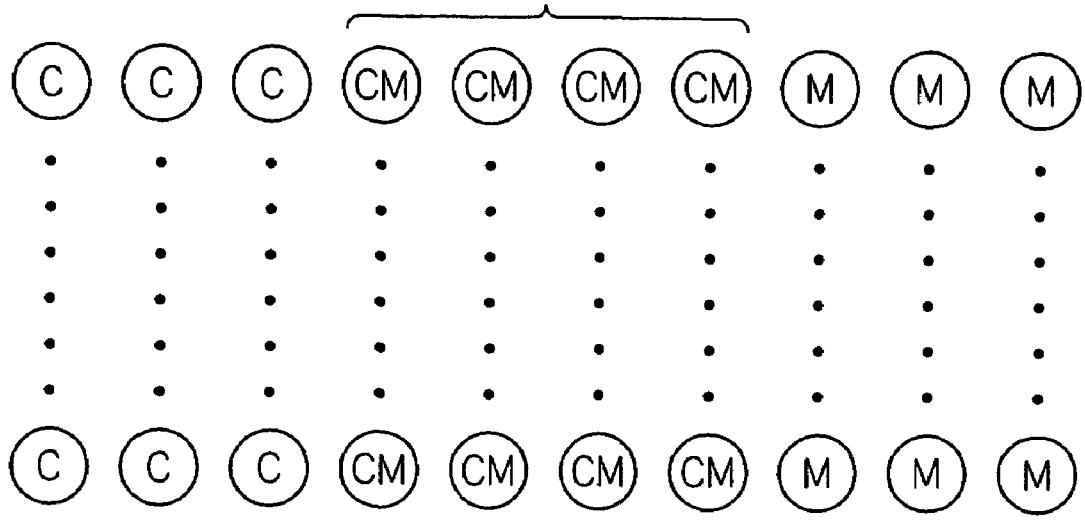
FIG. 5B is an illustrative diagram showing an enlarged view of a boundary region in same.

The color mixing evaluation print output device 48 generates data for a color mixing evaluation pattern 70 as illustrated in FIG. 4, and FIGS. 5A and 5B, or alternatively, data for a color mixing evaluation pattern 70 is called up from a prescribed memory and supplied to the print heads 12Y, 12C, 12M, and 12K via the head driver 36, and the data is outputted as a color mixing evaluation print.

Figure 7A:
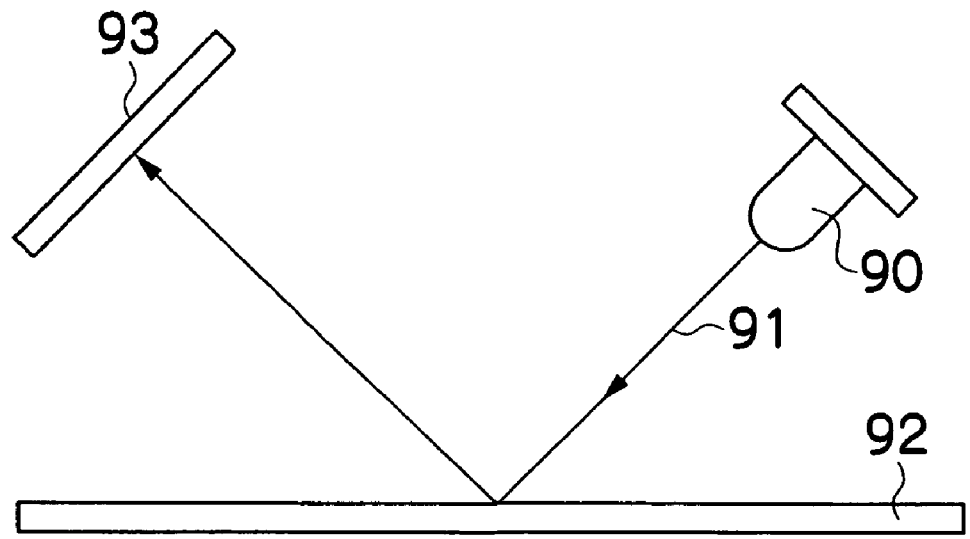
FIGS. 7A and 7B are illustrative diagrams indicating the principle of density measurement.
Figure 7B:
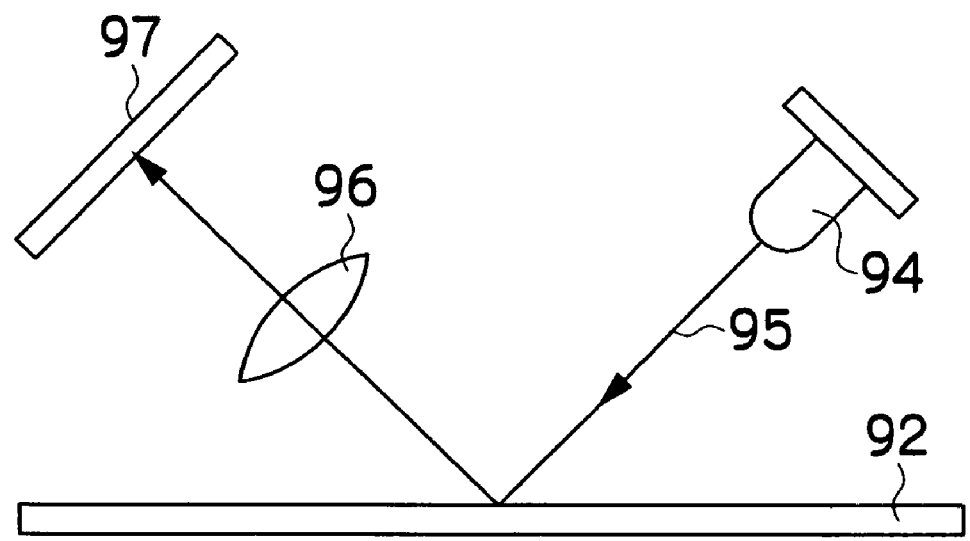

The density of the patches 72 in the outputted color mixing evaluation print (the color mixing evaluation patches) is measured by the densitometer 45. FIGS. 7A and 7B show the principles of this density measurement.

As shown in FIGS. 7A and 7B, a fine light spot 91 irradiated from an RGB light emitting element 90 is directed onto a measurement point on the medium 92, and the light reflected by the medium is received by a photoreceptor 93, such as a CCD element, whereby the density of the fine region can be measured. In this case, the RGB light emitting element may be composed, for example, by combining filters with a halogen lamp.

Alternatively, as shown in FIG. 7B, for example, a light beam 95 irradiated from an RGB light emitting element 94 may be directed onto a measurement point of the medium 92, the reflected light being condensed onto an area CCD 97 by means of a lens 96 in such a manner that the density can be measured.

This measurement is carried out by dividing the boundary region 72a between two colors into N segments in the vertical direction, as illustrated in FIG. 5A (for example, 10 equal segments or more), and then scanning from left to right as indicated by the arrow F. More specifically, the density is measured by performing fine scanning at a width of approximately 50-100 μm over a region approximately three times the size of the dot overlap region (see FIG. 5B), in the left-right direction, as indicated by the arrow D in FIG. 5A.

Figures 8, 9:
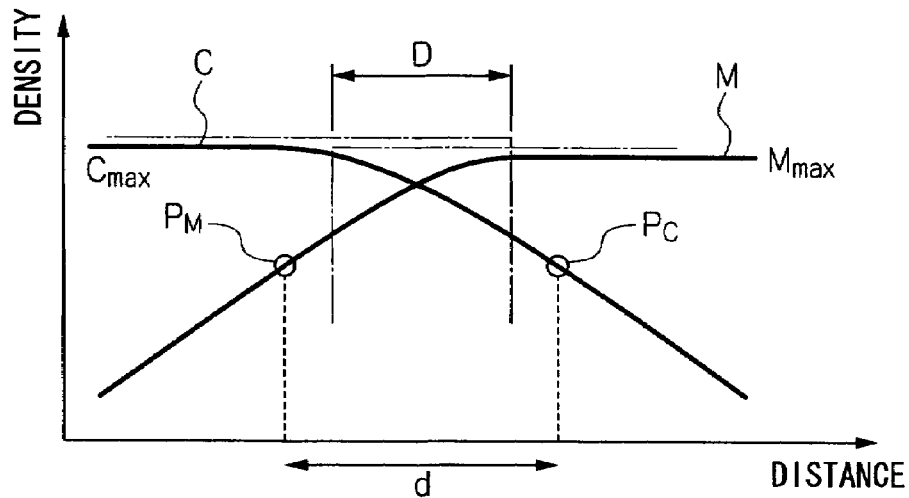
FIG. 8 is a graph showing density profiles measured by a densitometer in the respective patches of the color mixing evaluation pattern.
FIG. 9 is an illustrative diagram showing a method for evaluating color mixing by means of density measurement.

The measurement results from the densitometer 45 are reported to the color mixing evaluation device 49. FIG. 8 is a graph showing one example of density measurement results for the respective patches 72 (color mixing evaluation patches) of the color mixing evaluation print on which the color mixing evaluation patterns 70 are outputted. A graph of this kind showing a density profile is obtained for each scan in the direction of arrow F in FIG. 5A. The solid lines indicate the density when color mixing (bleeding) has occurred between the C ink and the M ink, and the single-dotted lines indicate the density in ideal conditions where there is no color mixing.

The average value/standard deviation calculation device 51 in the color mixing evaluation device 49 calculates the distance d between a prescribed threshold value, for instance, the 60% density point $P_M$ with respect to the maximum density of M, $M_{max}$, and the 60% density point $P_C$ with respect to the maximum density of C, $C_{max}$, and for each patch 72, it calculates the standard deviation σd and the average av(d) of the distances d obtained in the respective scans performed at the N equidistant positions in the vertical direction (namely, 10 or more equidistant positions). The lower the standard deviation σd or the average value av(d) of this distance d, the lower the extent of color mixing.

As shown in FIG. 9, the color mixing evaluation device 49 sends the combination of conveyance velocity V and fixing energy E which achieves a minimum for at least one of the standard deviation σd or average av(d) thus calculated, to the parameter setting device 46.

The parameter setting device 46 sets the combination of conveyance velocity V and fixing energy E which achieves a minimum for at least one of the standard deviation σd or average av(d), as the optimal parameters for preventing color mixing between those two ink colors on the recording paper 16. Furthermore, the parameter setting device 46 stores these parameters in association with the type of recording paper 16 and the type of ink reported by the medium type determination device 25 and the ink type determination device 28.

Here, the combination of the conveyance velocity V and the fixing energy E at which the standard deviation σd becomes a minimum is selected because it is considered to be linked to perceptible color mixing. The combination at which the average value av(d) becomes a minimum is selected because the decline in image resolution caused by color mixing is thought to be reflected in the average value av(d). In this way, it is possible to reduce color mixing to a minimum.

Accordingly, by setting the energy E (fixing energy or curing energy) and the conveyance velocity V at which color mixing is a minimum, then even if the print head separation distance S is uniform, it is still possible to satisfy the conditions S/V>t1 or S/V>t2, in relation to the fixing time t1 based on the fixing energy E and the curing time t2 based on the curing energy E.

Figure 10:
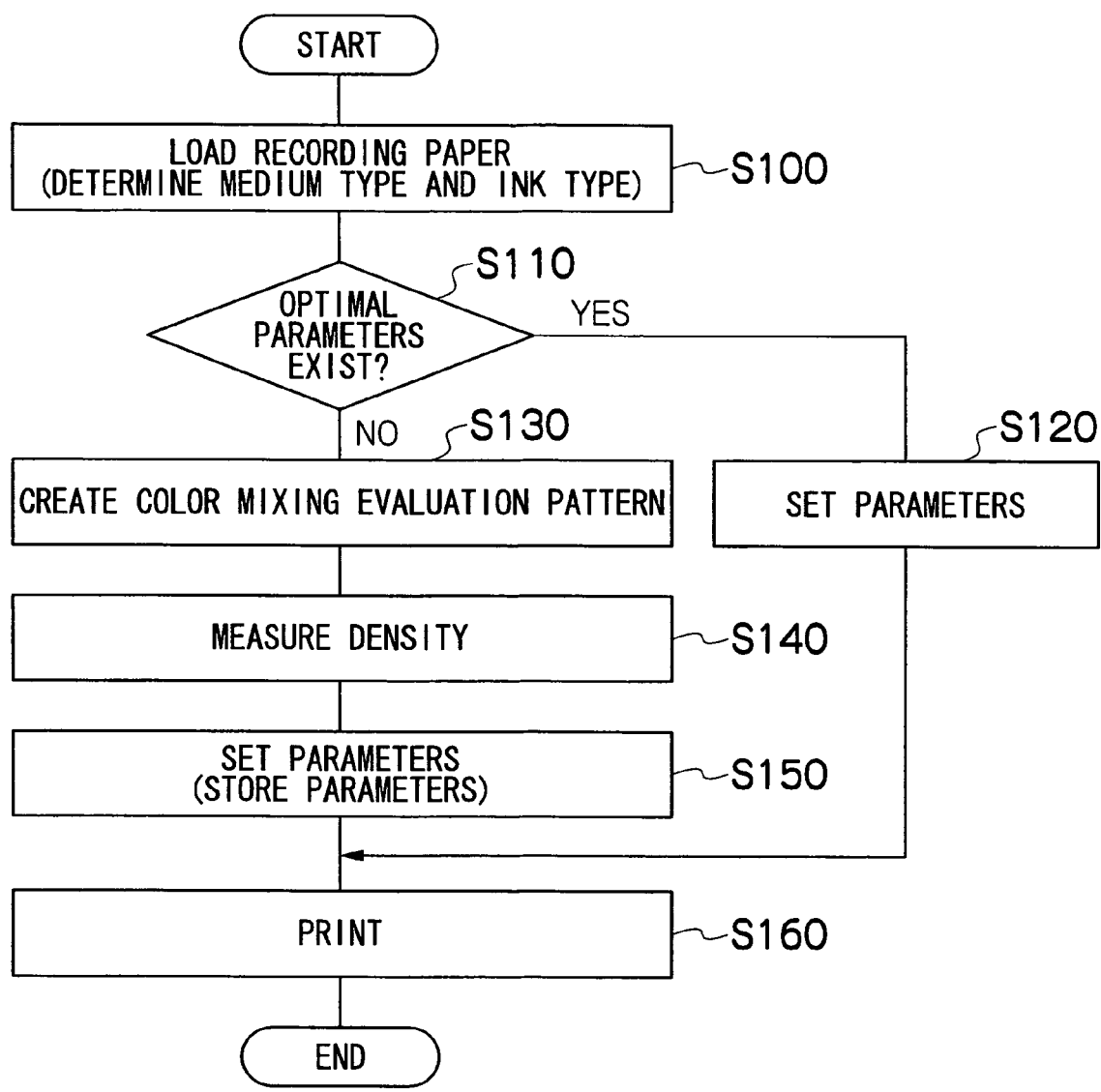
FIG. 10 is a flowchart illustrating the action of the first embodiment.

Below, the action of the present embodiment is described with reference to the flowchart in FIG. 10.

Figure 15:
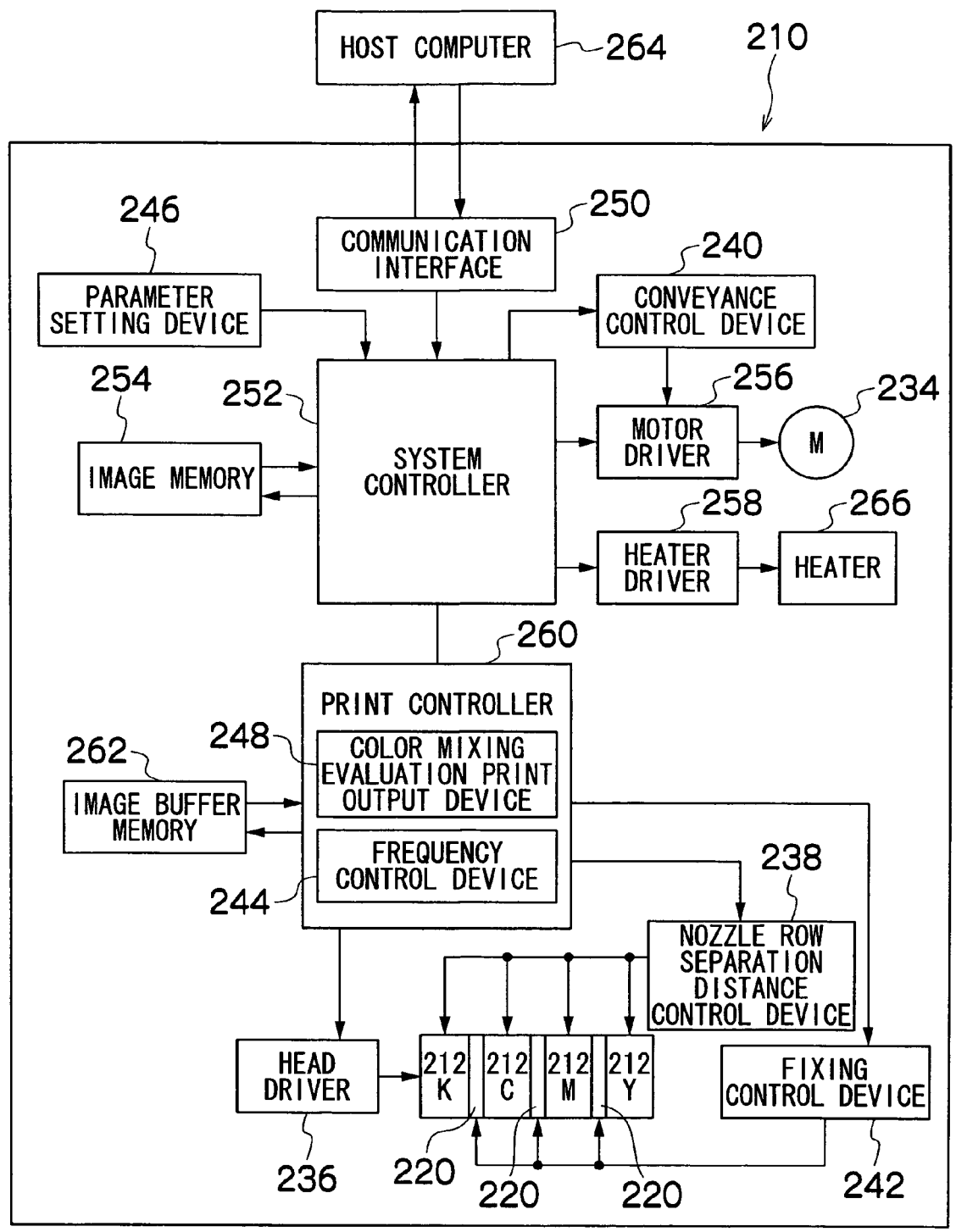
FIG. 15 is a block diagram showing the system composition of an inkjet recording apparatus according to a third embodiment of the present invention.

Firstly, at step S100 in FIG. 15, a magazine 22 for supplying recording paper 16 is loaded into the inkjet recording apparatus 10. As stated previously, an information recording body storing information such as the type of loaded recording paper 16 is attached to a medium type determination notch 22a on the magazine 22, and this information is read in by the medium type determination device 25. The information read in by the medium type determination device 25 is supplied to the parameter setting device 46. On the other hand, the ink type is determined by the ink type determination device 28 and the information on the ink type thus determined is also supplied to the parameter setting device 46.

At the next step, S110, the parameter setting device 46 judges whether or not optimal parameters corresponding to the supplied medium type information, or the like, have already been set and stored. If there exist optimal parameters corresponding to the medium type, or the like, then the procedure advances to step S120, and the optimal parameters (conveyance velocity V, fixing (curing) energy E) stored in the parameter setting device 46 are called up and set respectively in the conveyance control device 40, the fixing control device 42 and, if necessary, the head separation distance control device 38.

On the other hand, if no optimal parameters exist corresponding to the determined medium type, or the like, then the procedure advances to step S130 in order to create a color mixing evaluation pattern for establishing optimal parameters. If an information recording body is not attached to the magazine 22, or if one is attached but it cannot be read by the medium type determination device 25, then a dummy medium type is sent to the parameter setting device 46, for example, and it is supposed that no corresponding optimal parameters exist. The procedure then advances to step S130.

At step S130, various patches are outputted by the mutually adjacent print heads (12Y and 12C, 12C and 12M, 12M and 12K) at a plurality of different levels of the conveyance velocity V (the difference between discharge times) and the fixing energy E, in accordance with the method described above. Thereby, a color mixing evaluation pattern such as that illustrated in FIG. 4 is created.

Next, at step S140, the density of the respective patches of the color mixing evaluation pattern, and especially the boundary regions, is measured by the densitometer 45, and density profiles such as that shown in FIG. 8 are obtained. The measured density profiles are supplied to the color mixing evaluation device 49.

Next, at step S150, by referring to the density profiles as described above, the average value/standard deviation calculation device 51 in the color mixing evaluation device 49 calculates the average value av(d) and the standard deviation σd of the distance between the points of 60% density with respect to the maximum density for each color, identifies the combination of conveyance velocity V and fixing energy E which achieves a minimum value for at least one of the standard deviation and/or the average value, and stores the identified combination as optimal parameters in the parameter setting device 46.

Thereupon, at step S160, image recording (printing) is carried out using these optimal parameters. Furthermore, if it is judged that optimal parameters exist at step S110, and if these optimal parameters have been set at step S120, then printing is carried out at step S160.

In this way, according to the present embodiment, optimal parameters for preventing color mixing are previously established in accordance with the type of recording medium and the type of ink, and hence color mixing can be prevented readily, simply by determining the type of recording medium, and the like, at a later stage. Furthermore, even if it is not possible to determine the type of recording medium, by creating a color mixing evaluation pattern and outputting a color mixing evaluation print, measuring the density of the pattern, obtaining density profiles, and then setting optimal parameters for avoiding color mixing on this basis, it is possible to achieve high-quality image recording in which color mixing is prevented.

Furthermore, in the present embodiment, a method such as the following can be used for the processes after measuring the density of the color mixing evaluation pattern 70 with the densitometer 45.

More specifically, density profiles are measured by the densitometer 45 as described above and sent to the color mixing evaluation device 49, and in the color mixing evaluation device 49, the distance d between the points forming the prescribed threshold values of the density profiles of the two colors (for example, the 60% density points with respect to the maximum density) is calculated, and the standard deviation σd and average value av(d) of this distance d are calculated with respect to a plurality of density profiles obtained by a plurality of measurements.

Thereupon, the parameter setting device 246 specifies target values for the standard deviation σd and average value av(d) for the distances d thus calculated, (for example, in the case of the average distance, a target value of two times the overlap length D as illustrated in FIG. 5A or FIG. 8), as well as correction factors a1 and a2, and weighting factors b1 and b2. The target values, correction factors and weighting factors are stored in a mutually associated fashion, as illustrated in FIG. 11. These correction factors and weighting factors are multiplied by the factors used to calculate an evaluation value for evaluating color mixing, as described below.

Here, for example, respective values are specified for the weighting factors, b1 and b2, in accordance with the recording mode determined by the recording mode determination device 53 according to the image data (recording data), namely, a recording mode where a combination of text data and image data is recorded, or a recording mode where only image data is recorded, for example, as illustrated in FIG. 12. For example, in a mode where both text and images are to be recorded, the weighting factors b1 and b2 are equal, namely, b1=b2=1, whereas in image only mode, the weighting factor b1 is set to a larger value, namely, b1=2 and b2=1.

These values are then used to evaluate color mixing by means of the color mixing evaluation function indicated in the following formula (1):

$$\text{Color mixing evaluation formula } f = \sigma d \times a1 \times b1 + |av(d) - D| \times a2 \times b2. \quad (1)$$

In other words, the value of this color mixing evaluation function, f, is taken as an evaluation value for evaluating color mixing, and the smaller this value, the lower the identified level of color mixing. Therefore, the parameter setting device 46 sets the combination of relative conveyance velocity V and fixing energy E which corresponds to the patch 72 producing the lowest f value in this color mixing evaluation function, as the optimal parameters for avoiding color mixing.

Furthermore, as described previously, besides using a method where a color mixing evaluation pattern is created and used to establish optimal parameters for avoiding color mixing in accordance with the type of recording medium by satisfying the inequality S/V>t1 or S/V>t2, it is also possible to avoid color mixing by controlling the head separation distances S ($S_{CY}$, $S_{MC}$, $S_{KM}$), the conveyance velocity V, and the fixing time t1 or the curing time t2 (the fixing energy or the curing energy), directly, in such a manner that the aforementioned inequalities are satisfied. In this case, the relationship between fixing energy and fixing time t1, or the relationship between curing energy and curing time t2 is previously established with respect to various types of recording medium.

The head separation distances S (namely, the distance $S_{CY}$ between print heads 12Y and 12C, the distance $S_{MC}$ between print heads 12C and 12M, and the distance $S_{KM}$ between print heads 12M and 12K) are controlled by the head separation distance control device 38. For example, if the fixing time t1 is established definitely, and the conveyance velocity V is to be increased in order to shorten the difference between discharge times, then it becomes necessary to increase the head separation distances S.

Furthermore, if the print heads 12Y and so on are constituted by long line heads corresponding to the full breadthways direction of the recording paper 16, then it is possible to arrange the heads in such a manner that the head separation distances S increase toward the downstream side in the conveyance direction, in accordance with the decline in the osmotic pressure of the recording paper 16. Moreover, it is also possible to enhance drying by controlling the fixing and curing devices 20 by means of the fixing control device 42, in accordance with the amount of ink permeating into the recording paper 16.

Furthermore, the slower the permeation and drying of the ink and the greater the fixing time of the ink used in the head, or the greater the amount of curing energy required to cure the ink used in the head, the more preferable it becomes to arrange the print head 12Y, 12C, 12M and 12K toward the upstream side in the conveyance direction. Moreover, if the head separation distances S or the conveyance velocity V are varied, then it is desirable to control the discharge frequency of the print heads 12Y, 12C, 12M and 12K, in such a manner that the desired dot pitch is obtained in the recorded image. The discharge frequency can be controlled by means of a frequency control device 44, in response to conveyance velocity information supplied by the conveyance control device 40.

Next, a second embodiment of the present invention will be described.

Figure 13:
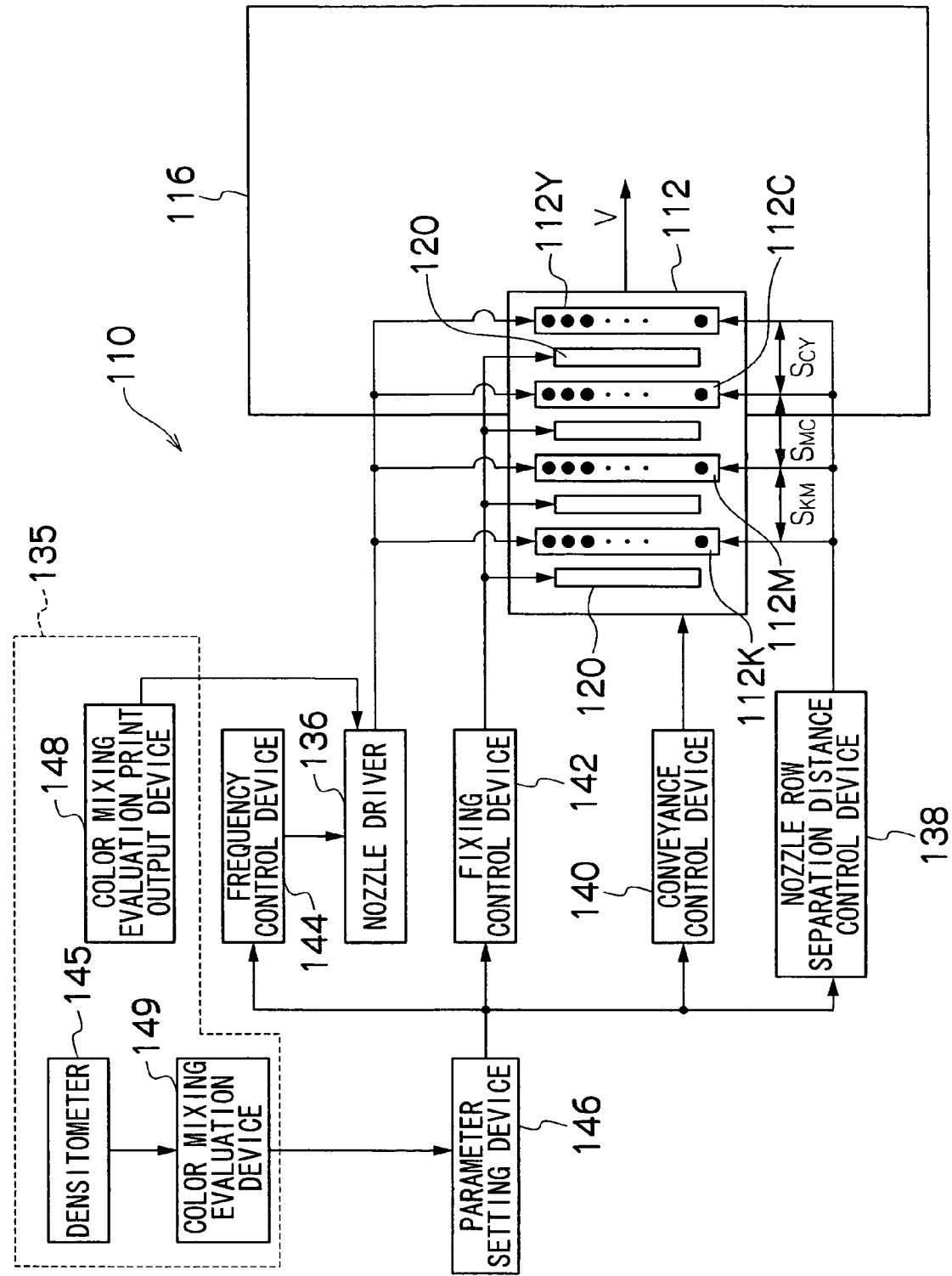
FIG. 13 is a block diagram including a partial plan view of the composition of an inkjet recording apparatus relating to a second embodiment of the present invention.

FIG. 13 is a block diagram showing a control device relating to color mixing prevention control, including a plan diagram showing an enlarged view of the region of the print head in an inkjet recording apparatus 110 relating to a second embodiment of the present invention.

As shown in FIG. 13, the print head 112 according to the second embodiment is a shuttle type head for recording images while moving reciprocally back and forth in the breadthways direction of the recording paper 116. In this case, the print head 112 performs image recording only when moving in one direction from one end toward the other end in the breadthways direction of the recording paper 116, and the print head 112 does not perform image recording when it reaches the far end and moves back to the first end.

In the print head 112, the nozzle rows 112Y, 112C, 112M and 112K discharging the inks of the respective colors, Y, M, C and K, are arranged in parallel with a direction substantially perpendicular to the conveyance direction of the print head 112 (the breadthways direction of the recording paper 116). The nozzle rows 112Y, 112C, 112M and 112K of the respective colors are arranged in such a manner that the nozzle row separation distances S between adjacent nozzle rows can be varied in sequence from the upstream side of the direction in which the print head 112 moves during recording (namely, the nozzle row separation distance $S_{CY}$ between the nozzle row 112Y and nozzle row 112C, the nozzle row separation distance $S_{MC}$ between the nozzle row 112C and the nozzle row 112M, and the nozzle row separation distance $S_{KM}$ between the nozzle row 112M and the nozzle row 112K).

Fixing and curing devices 120 are arranged in parallel with the nozzle rows 112Y, 112C, 112M and 112K, respectively on the downstream side thereof.

Moreover, the recording paper 116 remains stationary when the print head 112 is moved from one end toward the other end in the breadthways direction of the recording paper 116 while recording onto the paper. When the print head 112 has finished printing from one end to the other end in the breadthways direction of the recording paper 116 and has been moved back to the first end of the paper, then the recording paper 116 is conveyed in the direction perpendicular to the breadthways direction of the recording paper 116 by an amount corresponding to the width of the band-shaped region in the breadthways direction of the recording paper 116 that has just been recorded by the print head 112 (in other words, the width of the nozzle row 112Y, etc.)

In the present embodiment, since the print head 112 is a shuttle type head, then in contrast to the first embodiment described above, the recording paper 116 is halted during image recording and only the print head 112 is moved. The direction of movement of the print head 112 corresponds to the relative conveyance direction (between the recording paper 16 and the print head 12) in the first embodiment described above.

Furthermore, as shown in FIG. 13, similarly to the first embodiment, the inkjet recording apparatus 110 according to the present embodiment comprises, as control devices for preventing color mixing, a nozzle row separation distance control device 138 (which corresponds to the head separation distance control device 38 in the first embodiment), a nozzle driver 136 (which corresponds to the head driver 36 in the first embodiment), a conveyance control device 140, a fixing control device 142, a frequency control device 144, a parameter setting device 146, a color mixing evaluation print output device 148, a densitometer 145, a color mixing evaluation device 149, and the like. The nozzle driver 136 controls ink discharge in the respective nozzle rows and it corresponds to the head driver 36 in the first embodiment.

In the present embodiment, the nozzle row separation distance control device 138 is able to vary the actual distance between the nozzle rows 112Y, 112C, 112M and 112K (in other words, the distance $S_{CY}$ between the nozzle rows 112Y and 112C, the distance $S_{MC}$ between the nozzle rows 112C and 112M, and the distance $S_{KM}$ between the nozzle rows 112M and 112K).

Furthermore, the conveyance control device 140 controls the movement velocity (difference between discharge times) V of the print head 112 during recording, as the relative conveyance velocity.

It should be noted that the fixing control device 142, the frequency control device 144, the parameter setting device 146, the color mixing evaluation print output device 148, and the color mixing evaluation device 149 all operate in the same fashion as the first embodiment described above, and hence detailed description thereof is omitted here.

Consequently, the present embodiment differs from the first embodiment in that a shuttle head is used instead of a full line head, and therefore nozzle rows for all four colors are disposed in a single shuttle head, rather than providing nozzle rows for each color in separate line heads as in the first embodiment. However, the fact that the distance between nozzle rows can be changed, and the relationship between the print head (nozzle rows), the recording medium, and the relative conveyance direction, are all the same as in the first embodiment.

Consequently, in the present embodiment, control for avoiding color mixing can be achieved similarly to the first embodiment, and hence the action of the present embodiment is basically the same as that of the first embodiment. A simple description of the action of the present embodiment is given below.

The color mixing evaluation print output device 148 creates a color mixing evaluation pattern such as that shown in FIG. 4, or FIGS. 5A and 5B, and it supplies this data to the print head 112 via the nozzle driver 136, thereby outputting a color mixing evaluation print. The densities of the color mixing evaluation patches of the outputted color mixing evaluation print are measured by the densitometer 145. The density profiles obtained by this measurement are sent to the color mixing evaluation device 149. The color mixing evaluation device 149 calculates the distance d between the points forming the prescribed threshold values of the density profiles of the two colors (for example, the 60% density points with respect to the maximum density), and derives the standard deviation σd and average value av(d) of this distance d with respect to a plurality of density profiles obtained by a plurality of measurements. It selects the conveyance velocity and fixing energy which achieve a minimum for at least one of these values, av(d) or σd, and sends them to the parameter setting device 146.

The parameter setting device 146 establishes and stores these values as control parameters for the respective control devices. In this way, a preset value is established for at least one of the relative conveyance velocity V of the print head 112 (the movement velocity in the breadthways direction of the recording paper 116), the respective nozzle row separation distances $S_{CY}$, $S_{MC}$, $S_{KM}$, and the fixing energy E of the fixing and curing device 120. When optimal control parameters for avoiding color mixing have been established in this way, printing is carried out by driving the shuttle type print head 112.

Next, a third embodiment of the present invention will be described.

Figure 14:
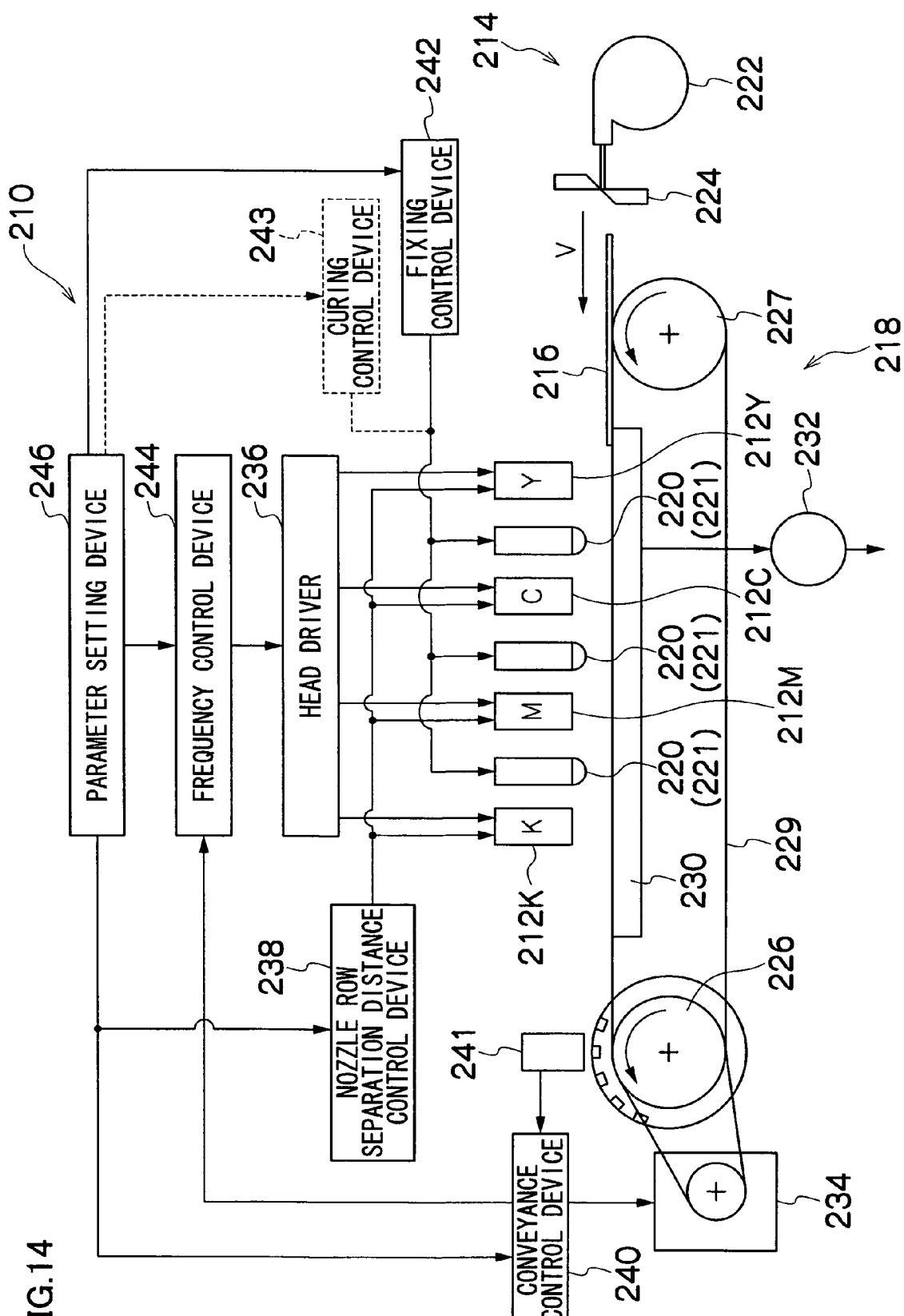
FIG. 14 is a general schematic drawing including a partial block diagram of the composition of an inkjet recording apparatus relating to a third embodiment of the present invention.

FIG. 14 is a general schematic drawing of an inkjet recording apparatus according to third embodiment of the present invention, showing at a block diagram in part.

As shown in FIG. 14, the inkjet recording apparatus 210 comprises: a plurality of print heads 212Y, 212C, 212M, and 212K for ink colors of yellow (Y), cyan (C), magenta (M), and black (K), respectively; a conveyance unit 218 for supplying a recording paper 216 as a recording medium from a paper supply unit 214 to the print heads 212Y, 212C, 212M, and 212K; and a fixing/curing device 220 (fixing device) for fixing and curing the ink deposited on the recording paper 216, and other components.

In FIG. 14, a magazine 222 for rolled paper (continuous paper) is shown as an example of the paper supply unit 214; however, a plurality of magazines with paper differences such as paper width and quality may be jointly provided. Moreover, paper may be supplied with a cassette that contains cut paper loaded in layers and that is used jointly or in lieu of a magazine 222 for rolled paper.

In the case of the configuration in which roll paper is used, a cutter 224 is provided as shown in FIG. 1, and the continuous paper is cut into a desired size by the cutter 224. When cut paper is used, the cutter 224 is not required.

The recording paper 216 delivered from the magazine 222 retains curl due to having been loaded in the magazine 222. In order to remove the curl, heat is applied to the recording paper 16 in the decurling unit (not shown) by a heating drum (not shown) in the direction opposite from the curl direction in the magazine 222. The heating temperature at this time is preferably controlled so that the recording paper 216 has a curl in which the surface on which the print is to be made is slightly round outward.

The conveyance unit 218 has a configuration in which an endless belt 229 is set around rollers 226 and 227 so that the portion of the endless belt 229 facing at least the nozzle face of the print heads 212Y, 212C, 212M, and 212K forms a horizontal plane (flat plane).

The belt 229 has a width that is greater than the width of the recording paper 216, and a plurality of suction apertures (not shown) are formed on the belt surface. A suction chamber 230 is disposed in a position facing the nozzle surface of the print heads 212Y, 212C, 212M, and 212K on the interior side of the belt 229, which is set around the rollers 226 and 227, as shown in FIG. 14; and the suction chamber 230 provides suction with a fan 232 to generate a negative pressure, and the recording paper 216 is held on the belt 229 by suction.

The belt 229 is driven in the counterclockwise direction in FIG. 14 by the motive force of a motor 234 being transmitted to at least one of the rollers 226 and 227 (for example, the roller 226 of left hand as shown in FIG. 14), which the belt 229 is set around, and the recording paper 216 held on the belt 229 is conveyed from left to right in FIG. 14 at the relative conveyance velocity V.

Similar to the first embodiment described above, the print heads 212Y, 212C, 212M, and 212K are corresponding to the YCMK ink colors, and form a full-line head in which a line head having a length that corresponds to the maximum paper width is disposed in the main scanning direction perpendicular to the delivering direction of the recording paper 216, which is substantially perpendicular to a width direction of the recording paper 216. A fixing/curing device 220 are also disposed between each of the print heads 212Y, 212C, 212M, and 212K corresponding to the maximum paper width.

Each of the print heads 212Y, 212C, 212M, and 212K comprises a plurality of nozzle rows (not illustrated) in which nozzles are arranged in the form of a two-dimensional matrix. The distance between the nozzle row on the upstream side of the print head 212Y with respect to the conveyance direction and the nozzle row on the upstream side of the print head 212C with respect to the conveyance direction is called the nozzle row separation distance $S_{CY}$ between these two colors Y and C. The nozzle row separation distance $S_{MC}$ between the nozzle row of the print head 12C and the nozzle row of the print head 12M, and the nozzle row separation distance $S_{KM}$ between the nozzle row of the print head 12M and the nozzle row of the print head 12K, are defined in a similar fashion. These nozzle row separation distances $S_{CY}$, $S_{MC}$, $S_{KM}$ are variable and can be controlled freely.

As shown in FIG. 14, the print heads 212K, 212C, 212M, 212Y corresponding to respective ink colors are disposed in the order, yellow (Y), cyan (C), magenta (M) and black (K), from the upstream side, following the direction of conveyance of the recording paper 216 (the right to leftward direction in the drawing). A color image can be formed on the recording paper 216 by discharging colored inks respectively from the print heads 212Y, 212C, 212M and 212K, while conveying the recording paper 216 by means of the conveyance unit 218.

Ink discharge from the print heads 212Y, 212C, 212M and 212K is controlled by the head driver 236. Furthermore, fixing and curing devices 220 provided between the respective print heads 212Y, 212C, 212M and 212K fix the ink discharged from the print heads 212Y, 212C, 212M and 212K onto the recording paper 216, and a suitable device is used according to the type of ink used.

The fixing and curing devices 220 are disposed respectively between the four print heads 212Y, 212C, 212M and 212K, as illustrated in FIG. 14, and they fix the ink discharged from the print heads in such a manner that there is no color mixing of the inks, even when ink is discharged from the next print head onto, or in the vicinity of, previously discharged ink.

In the present embodiment, by controlling at least one of three factors, namely, the respective nozzle row separation distances of the print heads 212Y, 212C, 212M and 212K of each color ($S_{CY}$, $S_{MC}$ and $S_{KM}$), and/or the (relative) conveyance velocity of the recording paper 216, and/or the fixing time through controlling the fixing energy applied to the ink by the fixing and curing devices 220, it is possible to prevent color mixing of the inks while recording images at high speed.

In the present embodiment, if the nozzle row separation distances are actually variable, then since the nozzle row separation distances are varied by changing the distances between the print heads, this is equivalent to saying that the nozzle row separation distances are controlled by controlling the distances between the print heads.

Furthermore, in the present embodiment, if color mixing is avoided by controlling the nozzle row separation distances (distances between print heads), the relative conveyance velocity, and the fixing time (the fixing energy), then by setting the various control parameters to optimal values in such a manner that recording can be performed as the highest possible speed, it is possible to prevent color mixing while also achieving high-speed recording.

Therefore, in addition to the foregoing, the inkjet recording apparatus 210 according to the present embodiment comprises, as devices for controlling and avoiding color mixing:

a nozzle row separation distance control device 238 which controls the nozzle row separation distance (print head separation distance); a relative conveyance velocity control device 240 (hereafter, simply called "conveyance control device" 240) which controls the relative conveyance velocity V of the recording paper 216; a fixing control device 242 which controls the fixing time of the ink by controlling the fixing energy of the fixing and curing devices 220; a frequency control device 244 for aligning the dot pitch of the recorded image in cases where the relative conveyance velocity is varied; and a parameter setting device 246 for setting control parameters in such a manner that the respective control devices implement optimal control. Furthermore, an encoder 241 for determining the relative conveyance velocity V is provided on the roller 226, in order that the relative conveyance velocity V can be controlled by the conveyance control device 240.

The nozzle row separation distance control device 238 controls the ink discharge timing from the (nozzle rows of the) respective print heads 212Y, 212C, 212M, and 212K onto the recording paper 216, by changing the distances between adjacent print heads (namely, the nozzle separation distances ($S_{CY}$, $S_{MC}$, $S_{KM}$) between the nozzle row formed in one print head and the nozzle row formed in the adjacent print head), by moving the print heads 212Y, 212C, 212M, and 212K of the respective colors in the paper conveyance direction.

The conveyance control device 240 controls the rotational speed of the motor 234 according to a determination signal from the rotary encoder 241. In this case, if an optimal value is set for the relative conveyance velocity parameter, V, as described below, then the rotation of the motor 234 is controlled in such a manner that the relative conveyance velocity of the recording paper 216 assumes the set velocity.

If the fixing and curing devices 220 apply heat, for example, then the fixing control device 242 controls the fixing time t1 by controlling the heat energy applied by changing the temperature setting of the fixing and curing devices 220, or by also changing the rotational speed of the fan blowing a hot air flow, and thus controlling the fixing energy applied to the ink on the recording paper 216.

Furthermore, the frequency control device 244 controls the ink discharge timing from the respective print heads 212Y, 212C, 212M and 212K, in accordance with any change in the relative conveyance velocity of the recording paper 216, in such a manner that the prescribed dot pitch is obtained in the recorded image.

An operator visually evaluates the color mixing of the inks, according to a color mixing evaluation print outputted by the inkjet recording apparatus 210 as described below, and the operator inputs the evaluation result via a color mixing evaluation result input device, such as a keyboard on an operating panel provided on the inkjet recording apparatus 210. The parameter setting device 246 sets optimal parameters for controlling at least one of the nozzle separation distance control device 238, the conveyance control device 240, and the fixing control device 242, according to the inputted color mixing evaluation result.

In the inkjet recording apparatus 210 relating to the present embodiment described above, color mixing is prevented by fixing the ink discharged onto the recording paper 216 by controlling the fixing and curing devices 220 by means of the fixing control device 242. However, it is also possible to use a UV-curable ink which is hardened by a polymerization reaction when UV light is irradiated onto the ink, or an ink that is curable by irradiation of electromagnetic radiation, in which case curing devices 221 such as irradiation devices for irradiating the appropriate electromagnetic radiation onto the ink are provided instead of the fixing and curing devices 220, color mixing of the inks being prevented by controlling the curing devices 221 by means of the curing control device 243 in such a manner that the ink is cured.

Below, where the fixing control device 242 and the fixing and curing devices 220 are described, it is also possible to use a curing control device 243 and curing devices 221 instead of these, as shown in FIG. 14, in which case, the control procedure is exactly the same. More specifically, the curing control device 243 may control the curing time t2 by, for example, controlling the curing energy applied to the ink on the recording paper 216 by changing the intensity of light irradiated by the curing devices 221, or the range of light irradiation.

FIG. 15 is a block diagram of the principal components showing the system configuration of the inkjet recording apparatus 210. The inkjet recording apparatus 210 has a communication interface 250, a system controller 252, an image memory 254, a motor driver 256, a heater driver 258, a print controller 260, an image buffer memory 262, a head driver 236, and other components.

The communication interface 250 is an interface unit for receiving image data sent from a host computer 264. A serial interface such as USB, IEEE1394, Ethernet, wireless network, or a parallel interface such as a Centronics interface may be used as the communication interface 250. A buffer memory (not shown) may be mounted in this portion in order to increase the communication speed. The image data sent from the host computer 264 is received by the inkjet recording apparatus 210 through the communication interface 50, and is temporarily stored in the image memory 254. The image memory 254 is a storage device for temporarily storing images inputted through the communication interface 250. The image memory 254 is not limited to memory composed of a semiconductor element, and a hard disk drive or another magnetic medium may be used.

The system controller 252 controls the communication interface 250, image memory 254, motor driver 256, heater driver 258, and other components. The system controller 252 has a central processing unit (CPU), peripheral circuits therefore, and the like. The system controller 252 controls communication between itself and the host computer 264, controls reading and writing from and to the image memory 254, and performs other functions, and also generates control signals for controlling a heater 266 and the motor 234 in the conveyance system.

The motor driver (drive circuit) 256 drives the motor 234 in accordance with commands from the system controller 252. The heater driver (drive circuit) 258 drives the heater 266 of the post-drying unit (not shown) or the like in accordance with commands from the system controller 252.

The print control unit 260 is a control unit having a signal processing function for performing various treatment processes, corrections, and the like, in accordance with the control implemented by the system controller 252, in order to generate a signal for controlling printing, from the image data in the image memory 254, and it supplies the print control signal (image data) thus generated to the head driver 236. Prescribed signal processing is carried out in the print control unit 260, and the discharge amount and the discharge timing of the ink droplets from the respective print heads 212Y, 212C, 212M, and 212K is controlled via the head driver 236, according to the image data. By this means, prescribed dot size and dot positions can be achieved.

The print control unit 260 is provided with the image buffer memory 262; and image data, parameters, and other data are temporarily stored in the image buffer memory 262 when image data is processed in the print control unit 260. The aspect shown in FIG. 15 is one in which the image buffer memory 262 accompanies the print control unit 60; however, the image memory 254 may also serve as the image buffer memory 262. Also possible is an aspect in which the print control unit 260 and the system controller 252 are integrated to form a single processor.

The head driver 236 drives actuators for the print heads 212Y, 212C, 212M and 212K of the respective colors according to the print data received from the print control unit 260. A feedback control system for keeping the drive conditions for the print heads constant may be included in the head driver 236.

Furthermore, the inkjet recording apparatus 210 according to the present embodiment also comprises, in addition to the foregoing, a nozzle row separation distance control device 238 for controlling the nozzle row separation distances, $S_{CY}$, $S_{MC}$, $S_{KM}$, between the adjacent print heads (in the present embodiment, this corresponds to the print heads 212Y and 212C, the print heads 212C and 212M, and the print heads 212M and 212K, as shown in FIG. 14); a conveyance control device 240 for controlling the relative conveyance velocity V of the recording paper 216; a fixing control device 242 for controlling the fixing time t1 of the ink discharged onto the recording paper 216 by controlling the fixing energy of the fixing and curing devices 220; a frequency control device 244 for controlling the ink discharge frequency in accordance with any change in the relative conveyance velocity V; a parameter setting device 246 for setting parameters for controlling the respective control devices; a color mixing evaluation print output device 248 for forming a color mixing evaluation pattern in order to output a print for evaluating color mixing as described in detail below, and outputting a print for evaluating color mixing from the print heads 212Y, 212C, 212M, and 212K, by means of the head driver 236; and the like.

Here, the frequency control device 244 and the color mixing evaluation print output device 248 are provided inside the print control unit 260 and are controlled by the system controller 252.

Next, a method for setting optimal parameters for the control devices in order to prevent color mixing and achieve high-speed recording will be described. Firstly, the process of creating a color mixing evaluation pattern in order to evaluate color mixing is described.

This color mixing evaluation pattern is used by an operator to visually evaluate color mixing, and it is formed by recording lines of two colors of ink at different values of the relative conveyance velocity V and the fixing energy E, in order to determine the degree of intermixing between the two colors of ink (yellow (Y) and cyan (C), cyan (C) and magenta (M), magenta (M) and black (K)) discharged from the nozzle rows of two print heads 212Y and 212C, 212C and 212M, and 212M and 212K, which are positioned adjacently in the inkjet recording apparatus 210, as shown in FIG. 14.

Figure 16:
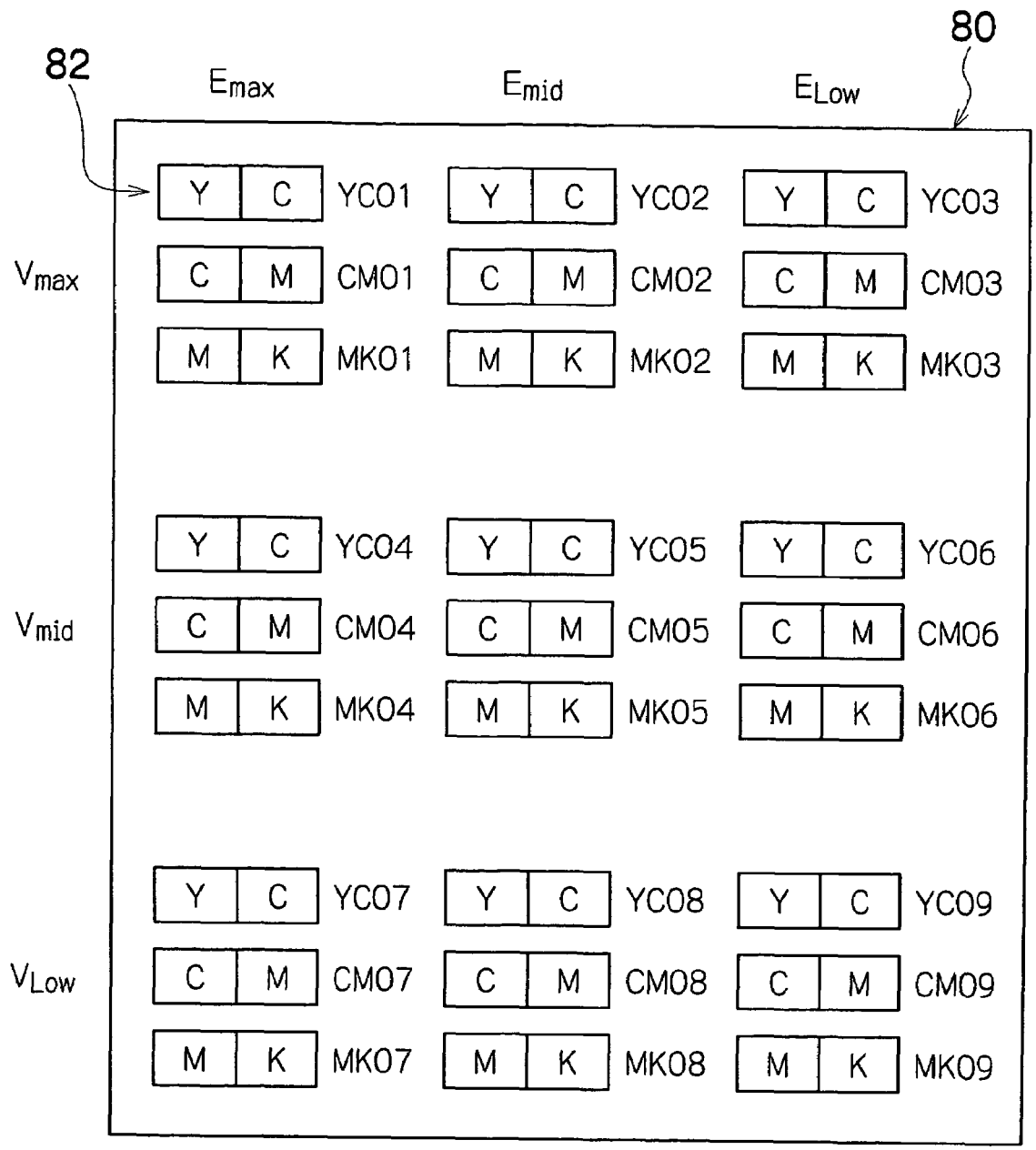
FIG. 16 is an illustrative diagram showing an example of a color mixing evaluation pattern used in the third embodiment.

FIG. 16 shows an example of a pattern used for visual evaluation of color mixing. As shown in FIG. 16, the color mixing evaluation pattern 80 is formed by recording at three different level settings, max, mid and low, for the relative conveyance velocity V and the fixing energy E. Therefore, for each combination of two adjacent ink colors, a patch 82 including 9 color mixing evaluation patterns is formed. Here, of the three levels for the conveyance velocity V and the fixing (curing) energy E, max indicates maximum velocity (or maximum energy), mid indicates a value at approximately ⅔ of the maximum, and low indicates a value at approximately ⅓ of the maximum.

Furthermore, as shown in FIG. 16, each of the nine patches 82 corresponding to the respective combinations of two colors are labeled with a number (reference numeral), namely, YC01-YC09, CM01-CM09, and MK01-MK09, so that they can be used when setting the parameters.

Figure 17:
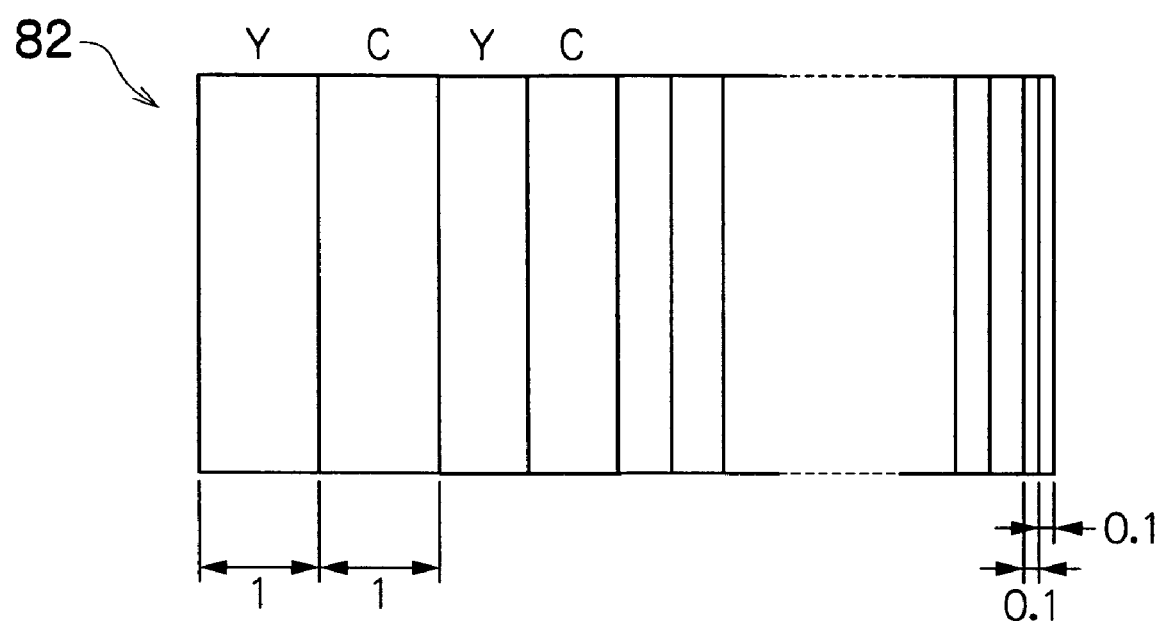
FIG. 17 is an illustrative diagram showing an enlarged view of a patch of the color mixing evaluation pattern in FIG. 16.

As shown in FIG. 17, the patches 82 of the respective color mixing patterns 80 include resolution charts in which the two colors (in this case, Y and C) are printed alternately in band shapes (rectangular shapes) which gradually decrease in width, from the left to the right-hand side. In particular, at the boundary regions between the two colors, a number of dots (1 to 2 dots) are printed in an overlapping fashion in order to evaluate color mixing. Furthermore, as shown in FIG. 17, the width of the respective band-shaped regions of Y and C is initially 1 mm each, for example, and the width gradually decreases and finally reaches a value of 0.1 mm each.

The color mixing evaluation print output device 248 generates data for a color mixing evaluation pattern 80 as illustrated in FIG. 16 and FIG. 17, or alternatively, data for a color mixing evaluation pattern 80 is called up from a prescribed memory and supplied to the print heads 212Y, 212C, 212M, and 212K via the head driver 236, and the data is outputted as a color mixing evaluation print.

In this way, the operator visually evaluates color mixing by using color mixing evaluation patterns outputted as a color mixing evaluation print, and for each combination of two colors, he or she identifies the patch of highest resolution showing least color mixing and the number of that patch is inputted to the parameter setting device 246. In this way, it is possible to set optimal parameters for the conveyance velocity (the difference between discharge times) V and the fixing energy E, in accordance with the combination of recording paper 216 and ink used.

Therefore, by selecting the combination of the fixing energy E and the conveyance velocity V which achieves the highest resolution with least color mixing, it is possible to satisfy the relationship, S/V>t1, with respect to the nozzle row separation distance S corresponding to the combination of colors ($S_{CY}$, $S_{MC}$ or $S_{KM}$) and the fixing time t1 corresponding to the fixing energy E. By setting the control parameters to these values, it is possible to avoid color mixing during image recording.

Below, the action of the present embodiment is described with reference to the flowchart in FIG. 18.

Figure 18:
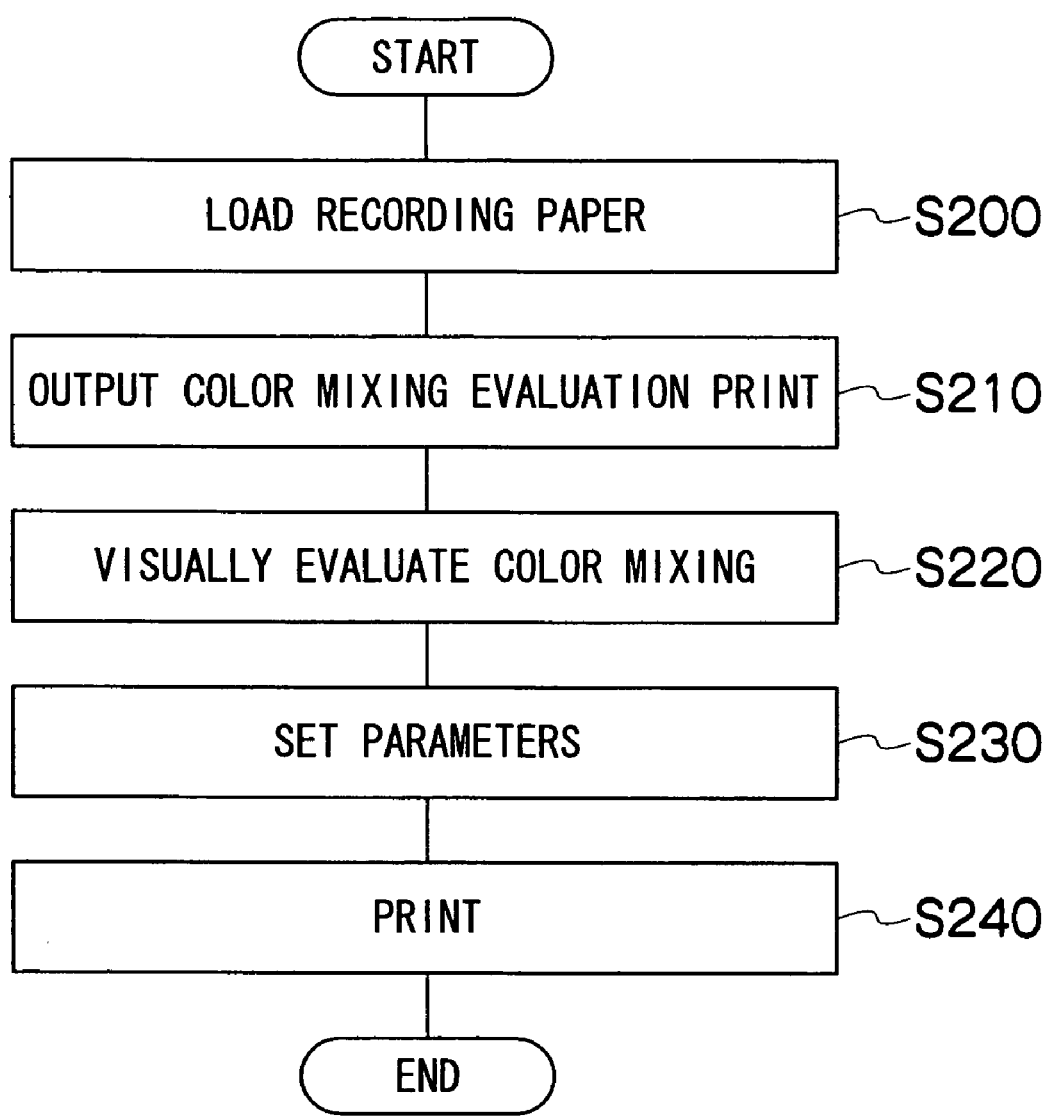
FIG. 18 is a flowchart illustrating the action of the third embodiment.

Firstly, at step S200 in FIG. 18, a magazine 222 for supplying recording paper 216 is loaded into the inkjet recording apparatus 210. At the next step, S210, a color mixing evaluation print is outputted. The color mixing evaluation print is outputted from the print heads 212Y, 212C, 212M, and 212K, via the head driver 236, by means of the color mixing evaluation print output device 248 creating data for a color mixing evaluation pattern 80 as illustrated in FIG. 16.

Next, at step S220, the operator visually evaluates the color mixing of the respective inks, by means of the outputted color mixing evaluation print. For each combination of two colors, the operator chooses a patch corresponding to the combination of conveyance velocity V and fixing energy E which produces least color mixing at the highest resolution.

In the next step, S230, the operator selects the patch number of the chosen patch as shown in FIG. 16, and inputs that number via a color mixing evaluation result input device, such as a keyboard (not illustrated). The parameter setting device 246 stores the control parameters, namely, the respective nozzle row separation distances S, the relative conveyance velocity V, and the fixing time t1 (fixing energy) corresponding to each patch number, and it sets the respective control parameters corresponding to the number inputted by the operator via the color mixing evaluation result input device, in the respective control devices. At step S240, printing is performed using the established control parameters.

In this way, in the present embodiment, the operator visually evaluates color mixing by using a color mixing evaluation pattern based on a resolution chart as illustrated in FIG. 17. Therefore, control parameters can be set which make it possible reliably to prevent color mixing, and once color mixing has been evaluated and the parameters have been set, then image recording can subsequently be carried out at high-speed, while avoiding the occurrence of color mixing by means of the established parameters.

Furthermore, in the present embodiment, the print heads 212Y, 212C, 212M, and 212K are arranged as shown in FIG. 14, and desirably, the slower the permeation and drying of the ink and the greater the fixing time of the ink used in the head, or the greater the amount of curing energy required to cure the ink used in the head, the more preferable it becomes to arrange the print head toward the upstream side in the conveyance direction. By arranging the print heads 212Y, 212C, 212M and 212K in this way, the ink discharged onto the recording paper 216 from one print head 212Y, 212C, 212M, 212K can be made to have a uniform drying state or curing state when it arrives at the next print head (on the downstream side) 212Y, 212C, 212M, 212K. Therefore, color mixing can be prevented in an effective manner.

As stated above, if the curing control device 243 controls the curing time t2 by regulating the curing energy applied by the curing devices 221, then it is possible to control at least one of the curing energy E, conveyance velocity V and nozzle row separation distance S, in such a manner that S/V>t2, so that color mixing is avoided.

In the respective embodiments described above, the nozzle groups are formed into respective print heads or respective nozzle rows corresponding to different ink colors, and color mixing between the inks on the surface of the recording medium can be prevented by controlling the time difference between the ink discharge timings of the respective print heads or the respective nozzle rows, in such a manner that this time difference is greater than the ink absorption time between respective print heads or respective nozzle rows.

Furthermore, various specific control methods are possible for making the discharge time difference greater than the ink absorption time, for instance: a method in which the print heads (nozzles rows) are arranged at a print head separation distance whereby the conveyance time of the recording medium from one print head to the next print head is equal to or greater than the ink absorption time; a method in which fixing energy, or curing energy for hardening a curable ink such as UV ink or a solid ink, is applied in such a manner that the ink becomes fixed within the conveyance time of the recording medium between respective print heads (nozzle rows); or a method in which the relative conveyance velocity of the recording medium is established in accordance with the ink absorption time or ink curing time of the recording medium between respective print heads (nozzle rows). By adopting these methods, it is possible to avoid color mixing between inks on the surface of the recording medium, while also achieving high-speed recording.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method for evaluating color mixing between dots of two different colors discharged onto a recording medium, the method comprising the steps of:
outputting a color mixing evaluation print having a color mixing evaluation patch formed on a recording medium by dots of two different colors in such a manner that at least a portion of the dots are adjacent or overlapping;
measuring a density of the color mixing evaluation patch of the outputted color mixing evaluation print; and
evaluating color mixing of the dots of two colors, according to density profiles for the dots of two colors forming the color mixing evaluation patch, as obtained by the density measuring step;
wherein the color mixing between the dots of two colors is evaluated according to at least one of an average value and a standard deviation of a distance between points which are prescribed threshold values for each color in a plurality of density profiles relating to the dots of two colors forming the color mixing evaluation patch, as obtained by measuring the density of the color mixing evaluation patch at a plurality of locations.

2. A method for evaluating color mixing between dots of two different colors discharged onto a recording medium, the method comprising the steps of:
outputting a color mixing evaluation print including a plurality of color mixing revaluation patches in which dots of two different colors are recorded in adjacent areas in parallel fashion in such a manner that at least a portion of the dots of two different colors are adjacent or overlapping and form the color mixing evaluation patch including non-mixed areas of the two different colors and an adjacent or overlapping area between the non-mixed areas, while varying at least one of parameters of a difference between discharge times of the dots of two different colors, a fixing energy for fixing the dots onto the recording medium and a curing energy for the dots, between a plurality of levels;
measuring a density of each of the color mixing evaluation patches of the outputted color mixing evaluation print; and
evaluating color mixing of the dots of two colors, according to density profiles of the dots of two colors forming the color mixing evaluation patches, as obtained by the density measuring step, for each combination of the parameters,
wherein the color mixing between the dots of two colors is evaluated according to at least one of an average value and a standard deviation of a distance between points which are prescribed threshold values for each color in a plurality of density profiles relating to the dots of two colors forming the color mixing evaluation patches, as obtained by measuring the density of the color mixing evaluation patches at a plurality of locations.

3. A method for evaluating color mixing between dots of two different colors discharged onto a recording medium, the method comprising the steps of:
outputting a color mixing evaluation print including a plurality of color mixing evaluation patches in which dots of two different colors are recorded in parallel fashion in such a manner that at least a portion of the dots of two different colors are adjacent or overlapping, while varying at least one of parameters of a difference between discharge times of the dots of two different colors, a fixing energy for fixing the dots onto the recording medium and a curing energy for the dots, between a plurality of levels;
calculating one of an average value and a standard deviation of a distance between the points which are prescribed threshold values for each color in a plurality of density profiles relating to the dots of two colors forming the color mixing evaluation patch, as obtained by measuring the density of each color mixing evaluation patch of the color mixing evaluation print at a plurality of locations; and
evaluating color mixing by calculating an evaluation value used to evaluate the color mixing by weighting factors for calculating the evaluation value, in accordance with the average value of the distance, the standard deviation of the distance, the difference between discharge times, and a recording mode which indicates whether a matter to be recorded is text, image, or both text and image.

4. An image recording method for recording an image by discharging dots onto a recording medium, the method comprising the step of performing image recording by setting control parameters for controlling at least one of the difference between the discharge times of the dots of two different colors, the fixing energy for fixing the dots onto the recording medium, and the curing energy for the dots, according to a color mixing evaluation result obtained by means of the method as defined in one of claims 1, 2, or 3.

5. The image recording method as defined in claim 4, further comprising the step of setting the control parameters in accordance with a type of dot, a type of recording medium, and the recording mode which indicates whether a matter to be recorded is text, image, or both text and image.

6. An apparatus for evaluating color mixing between dots of two different colors discharged onto a recording medium, the apparatus comprising:
a color mixing evaluation print output device which outputs a color mixing evaluation print including a plurality of color mixing evaluation patches in which dots of two different colors are recorded in adjacent areas in parallel fashion in such a manner that at least a portion of the dots of two different colors are adjacent or overlapping and form the color mixing evaluation patch including non-mixed areas of the two different colors and an adjacent or overlapping area between the non-mixed areas, while varying at least one of parameters of a difference between discharge times of the dots of two different colors, a fixing energy for fixing the dots or to the recording medium and a curing energy for the dots, between a plurality of levels;
a density measurement device which measures a density of each of the color mixing evaluation patches of the outputted color mixing evaluation print; and
a color mixing evaluation device which evaluates color mixing of the dots of two colors, according to density profiles of the dots of two colors forming the color mixing evaluation patches, as obtained by the density measurement device, for each combination of the parameters,
wherein the color mixing evaluation device which evaluates the color mixing between the dots of two colors includes a device which calculates an average value and a standard deviation, of a distance between points which are prescribed threshold values for each color in a plurality of density profiles relating to the dots of two colors forming the color mixing evaluation patch, as obtained by measuring the density of the color mixing evaluation patch at a plurality of locations; and
the color mixing evaluation device evaluates the color mixing according to the average value and the standard deviation of the distance thus calculated.

7. An image recording apparatus which records an image by discharging dots onto a recording medium, the apparatus comprising:
- the color mixing evaluation apparatus as defined in claim 4;
- a discharge time difference control device which controls the difference between the discharge times of the dots of two different colors when recording image data onto the recording medium;
- a fixing device which fixes the dots onto the recording medium;
- a fixing control device which controls the fixing energy of the fixing device;
- a curing device which cures the dots;
- a curing control device which controls the curing energy of the curing device; and
- a parameter setting device which sets the control parameters for controlling the discharge time difference control device, the fixing control device and the curing control device, according to the color mixing evaluation result obtained by the color mixing evaluation apparatus,
- wherein the image recording is performed by controlling at least one of the discharge time difference control device, the fixing control device and the curing control device, by means of the set control parameters.

8. The image recording apparatus as defined in claim 7, further comprising:
- an ink type determination device which determines a type of ink;
- a recording medium type determination device which determines a type of the recording medium;
- a recording mode determination device which determines a recording mode indicating whether a matter to be recorded is text, image or both text and image, from the recording image data; and
- a device for setting and storing the control parameters in accordance with the ink type, the recording medium type and the recording mode.

9. An image recording apparatus which records an image by discharging dots onto a recording medium, the apparatus comprising:
- a color mixing evaluation print output device which outputs a color mixing evaluation print including a plurality of color mixing evaluation patches in which dots of two different colors are recorded in parallel fashion in such a manner that at least a portion of the dots of two different colors are adjacent or overlapping, while varying at least one of parameters of a difference between discharge times of the dots of two different colors, a fixing energy for fixing the dots onto the recording medium and a curing energy for the dots, between a plurality of levels;
- a discharge time difference control device which controls the difference between the discharge times of the dots of two different colors when recording image data onto the recording medium;
- a fixing device which fixes the dots onto the recording medium;
- a fixing control device which controls the fixing energy of the fixing device;
- a curing device which cures the dots;
- a curing control device which controls the curing energy of the curing device;
- a color mixing evaluation result input device for inputting an evaluation result for the color mixing between the dots of two colors according to the color mixing evaluation patches in the color mixing evaluation print; and
- a parameter setting device which sets the control parameters for controlling the discharge time difference control device, the fixing control device and the curing control device, according to the color mixing evaluation result inputted to the color mixing evaluation result input device,
- wherein the image recording is performed by controlling at least one of the discharge time difference control device, the fixing control device and the curing control device, by means of the set control parameters.

10. The image recording apparatus as defined in claim 9, further comprising:
- an ink type determination device which determines a type of ink;
- a recording medium type determination device which determines a type of the recording medium;
- a recording mode determination device which determines a recording mode indicating whether a matter to be recorded is text, image or both text and image, from the recording image data; and
- a device for setting and storing the control parameters in accordance with the ink type, the recording medium type and the recording mode.

* * * * *